United States Patent
Lin et al.

(10) Patent No.: US 11,544,900 B2
(45) Date of Patent: Jan. 3, 2023

(54) PRIMITIVE-BASED 3D BUILDING MODELING, SENSOR SIMULATION, AND ESTIMATION

(71) Applicant: General Electric Company, Schenectady, NY (US)

(72) Inventors: Yen-Liang Lin, Redwood City, CA (US); Xia Li, Lexington, MA (US); James Vradenburg Miller, Clifton Park, NY (US); Walter V Dixon, III, Duanesburg, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 177 days.

(21) Appl. No.: 16/935,547

(22) Filed: Jul. 22, 2020

(65) Prior Publication Data
US 2021/0027532 A1    Jan. 28, 2021

Related U.S. Application Data

(60) Provisional application No. 62/878,441, filed on Jul. 25, 2019.

(51) Int. Cl.
G06T 17/05    (2011.01)
G06T 7/11     (2017.01)
G06T 17/10    (2006.01)

(52) U.S. Cl.
CPC .............. G06T 17/05 (2013.01); G06T 7/11 (2017.01); G06T 17/10 (2013.01);
(Continued)

(58) Field of Classification Search
CPC ......... G06T 17/20; G06T 17/00; G06T 19/20; G06T 7/12; G06T 7/11;
(Continued)

(56) References Cited

U.S. PATENT DOCUMENTS 8,675,951 B2    3/2014   Van Den Hengel
9,208,609 B2   12/2015   Taguchi et al.
(Continued)

FOREIGN PATENT DOCUMENTS

CN    108122277 A    6/2018
CN    110610011 A   12/2019
JP    2019168976 A  10/2019

OTHER PUBLICATIONS

Zheng Y, Weng Q, Zheng Y. A hybrid approach for three-dimensional building reconstruction in indianapolis from LiDAR data. Remote Sensing. Mar. 26, 2017;9(4):310. (Year: 2017).*

(Continued)

*Primary Examiner* — Xiao M Wu
*Assistant Examiner* — Scott E Sonners
(74) *Attorney, Agent, or Firm* — Buckley, Maschoff & Talwalkar LLC

(57) ABSTRACT

According to some embodiments, a system, method and non-transitory computer-readable medium are provided comprising a 3D building modeling module; a memory for storing program instructions; a 3D building modeling processor, coupled to the memory, and in communication with the 3D building modeling module and operative to execute program instructions to: receive a region of interest; receive an image of the region of image from a data source; generate a surface model based on the received image including one or more buildings; generate a digital height model; decompose each building into a set of shapes; apply a correction process to the set of shapes; execute a primitive classification process to each shape; execute a fitting process to each classified shape; select a best fitting model; and generate a 3D model of each building. Numerous other aspects are provided.

20 Claims, 19 Drawing Sheets

(52) U.S. Cl.
CPC .............. *G06T 2207/10028* (2013.01); *G06T 2207/10032* (2013.01); *G06T 2207/20081* (2013.01); *G06T 2207/30184* (2013.01)

(58) Field of Classification Search
CPC . G06T 2207/10028; G06T 2207/20081; G06T 17/10; G06T 2200/08; G06T 2200/04; G06T 2219/2021; G06T 19/00; G06T 19/006; G06T 7/50; G06T 7/251; G06T 7/60; G06T 7/75; G06T 7/74; G06T 7/13; G06T 17/05; G06T 2207/10012; G06T 2207/20128; G06T 2207/20084; G06T 7/33; G06T 7/0014; G06T 7/73; G06V 20/64; G06V 40/171; G06V 10/44; G06V 40/166; G06V 20/653; G06V 10/40; G06V 20/647; G06V 40/172; G06V 10/26; G06V 20/176; G06V 20/00; G06V 10/457; G06V 10/46; G06V 10/255; G06V 2201/12; G06V 20/13; G06V 20/695; G06V 10/24
See application file for complete search history.

(56) References Cited

U.S. PATENT DOCUMENTS

| | | |
|---|---|---|
| 9,424,373 B2 | 8/2016 | Zebedin |
| 9,436,987 B2 | 9/2016 | Ding |
| 9,734,638 B2 | 8/2017 | Cohen-Or |
| 11,043,026 B1* | 6/2021 | Fathi ..................... G06N 20/00 |
| 2006/0061566 A1* | 3/2006 | Verma ..................... G06T 17/20 |
| | | 345/582 |
| 2015/0363645 A1* | 12/2015 | Chen ........................ G06T 7/50 |
| | | 382/173 |
| 2019/0066374 A1 | 2/2019 | Santos |
| 2019/0392087 A1 | 12/2019 | Suard et al. |
| 2020/0074730 A1 | 3/2020 | Shloosh et al. |

OTHER PUBLICATIONS

Kada M, McKinley L. 3D building reconstruction from LiDAR based on a cell decomposition approach. International Archives of Photogrammetry, Remote Sensing and Spatial Information Sciences. Sep. 3, 2009;38(Part3):W4. (Year: 2009).*

Lafarge F, Descombes X, Zerubia J, Pierrot-Deseilligny M. Structural approach for building reconstruction from a single DSM. IEEE Transactions on pattern analysis and machine intelligence. Nov. 25, 2008;32(1):135-47. (Year: 2008).*

Remondino. F. et al., "Detailed Primitive-based 3D Modeling of Architectural Elements", International Archives of the Photogrammetry, Remote and Spatial Information Sciences, vol. No. XXXIX-B5, Aug. 25-Sep. 1, 2012, (pp. 285-290, 6 total pages).

Li, Xia et al.,"Supervised Fitting of Geometric Primitives to 3D Point Clouds", Jan. 28, 2020, (pp. 01-11, 11 total pages).

Li, Xia et al., "Primitive-based 3D Building Modeling, Sensor Simulation and Estimation", Computer Vision and Pattern Recognition, Jan. 16, 2019, (pp. 01-04, 4 total pages).

* cited by examiner

Random rectangle

Random subdivision

Building footprint

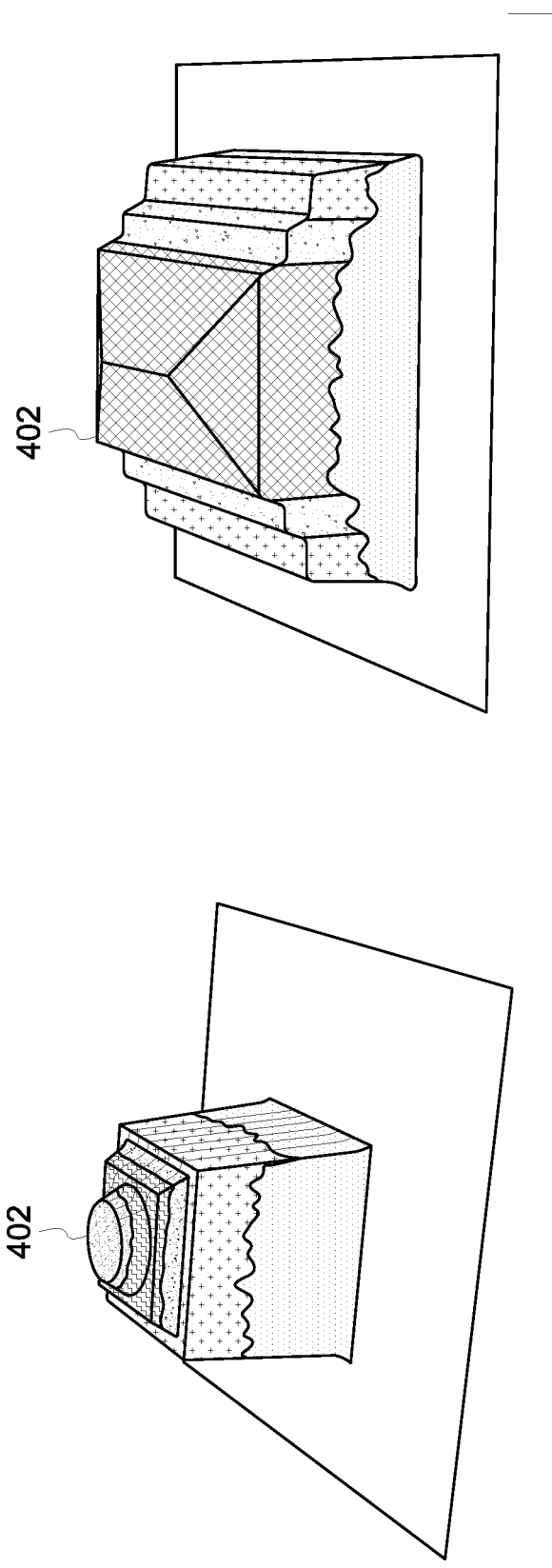

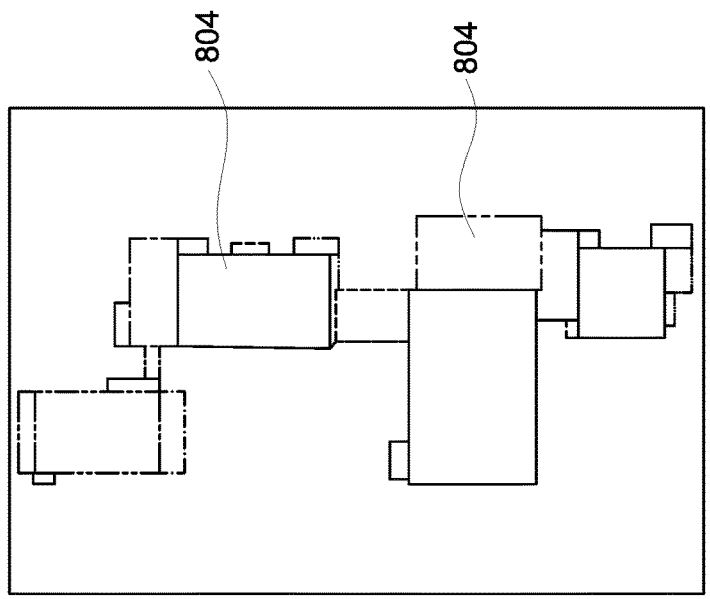
FIG. 8C Final decomposition
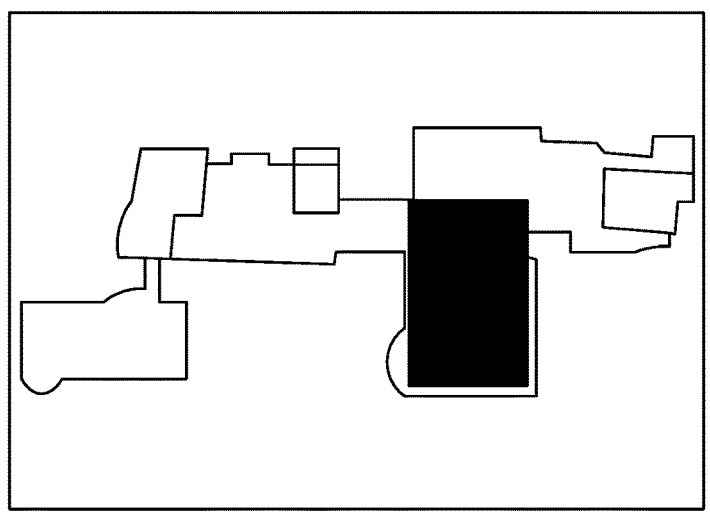
FIG. 8B After 1st region removed
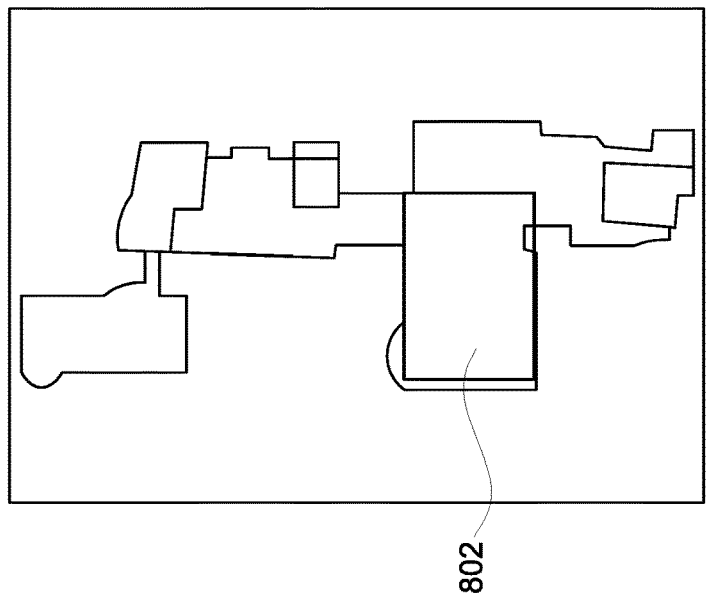
FIG. 8A Best 1st region

PRIMITIVE-BASED 3D BUILDING MODELING, SENSOR SIMULATION, AND ESTIMATION

CROSS REFERENCE TO RELATED APPLICATION

This application claims benefit to and priority of U.S. Provisional Patent Application Ser. No. 62/878,441, filed on Jul. 25, 2019, entitled "PRIMITIVE-BASED 3D BUILDING MODELING, SENSOR SIMULATION, AND ESTIMATION", the contents of which are hereby incorporated herein by reference in its entirety for all purposes.

GOVERNMENT SUPPORT

This invention was made with government support under D17PC00287 awarded by the U.S. Department of Interior, and supported by the Office of the Director of National Intelligence (ODNI), Intelligence Advanced Research Projects Activity (IARPA). The government has certain rights in the invention.

BACKGROUND

Reconstructing realistic 3D building models from remote sensor data may benefit several tasks including physical security vulnerability assessment, mission planning, and urban visualization, etc. A primitive based representation provides several advantages over a polygonal mesh representation, such as regularization through prior knowledge, compact representation, and symbolic representation. However, building modeling and primitive fitting are still challenging tasks.

It would be desirable to provide systems and methods to improve the reconstruction of realistic 3D building models.

SUMMARY

According to some embodiments, a system comprises a 3D building modeling module; a memory for storing program instructions; a 3D building modeling processor, coupled to the memory, and in communication with the 3D building modeling module and operative to execute program instructions to: receive a region of interest; receive an image of the region of image from a data source; generate a surface model based on the received image including one or more buildings; generate a digital height model; decompose each building into a set of shapes; apply a correction process to the set of shapes; execute a primitive classification process to each shape; execute a fitting process to each classified shape; select a best fitting model; and generate a 3D model of each building.

According to some embodiments, a computer-implemented method comprises receiving a region of interest; receiving an image of the region of image from a data source; generating a surface model based on the received image including one or more buildings; generating a digital height model; decomposing each building into a set of shapes; applying a correction process to the set of shapes; executing a primitive classification process for each shape; executing a fitting process for each classified shape; selecting a best fitting model; and generating a 3D model of each building.

According to some embodiments a non-transient, computer-readable medium storing instructions to be executed by a processor to perform a method comprising receiving a region of interest; receiving an image of the region of image from a data source; generating a surface model based on the received image including one or more buildings; generating a digital height model; decomposing each building into a set of shapes; applying a correction process to the set of shapes; executing a primitive classification process for each shape; executing a fitting process for each classified shape; selecting a best fitting model; and generating a 3D model of each building.

A technical effect of some embodiments of the invention is an improved and/or computerized technique and system for reconstructing 3D building primitives from 2.5D height maps or 3D point clouds, which are obtained from stereo reconstruction of sensor data. One or more embodiments provide for representing buildings and other man-made structures from reconstructed digital height models 102 with a collection of geometric primitives 104 (FIG. 1). Embodiments may be applied to a variety of building shapes and may represent the buildings by concise primitive representation, which may have significant lower complexity than conventional polygonal mesh models. As used herein, "primitive" refers to a simple parametric 3D geometric object (e.g., boxes, rectangular prisms, cylinders, cubes, hipped roofs, gables, etc.) that can be expressed precisely with a low number of polygonal faces, and a "polygonal mesh" refers to a dense representation of similar sized faces, assembled to represent complex structure.

Embodiments provide a decomposition module that may decompose the building model into a set of sections/shapes by leveraging simulated data. Embodiments may provide a parametric modeling framework for handling buildings with multiple shapes and may estimate the vertex positions of a roof model that may satisfy geometric constraints. One or more embodiments may apply a learning-based extrusion approach that regularizes noisy 3D contours into more complete contours and extrudes 2D polygons into a 3D mesh. One or more embodiments may provide reconstructed 3D building primitives for use in mission planning/rehearsal, human perspective line-of-sight, site/target familiarization, physical security vulnerability assessments, fly-overs and simulations, dynamic models/change detection and updating, gaming/training games, disaster relief, urban visualization, and any other suitable application.

When modeling large, realistic 3D building scenes, it may be helpful to consider a more compact representation over the polygonal mesh model. Due to the large amounts of annotated training data used with conventional polygonal mesh models, which is costly to obtain, instead embodiments leverage synthetic data to train a 3D building modeling module to be used with the satellite image domain. By utilizing the synthetic data, embodiments formulate the building decomposition as an application of instance/same time segmentation and primitive fitting to decompose a building into a set of primitive shapes.

With this and other advantages and features that will become hereinafter apparent, a more complete understanding of the nature of the invention can be obtained by referring to the following detailed description and to the drawings appended hereto.

Other embodiments are associated with systems and/or computer-readable medium storing instructions to perform any of the methods described herein.

BRIEF DESCRIPTION OF THE DRAWINGS

FIG. 4 is a non-exhaustive example of building designs according to some embodiments.

FIGS. 8A-8C are a non-exhaustive example of segmentation according to some embodiments.

DETAILED DESCRIPTION

Figure 1:
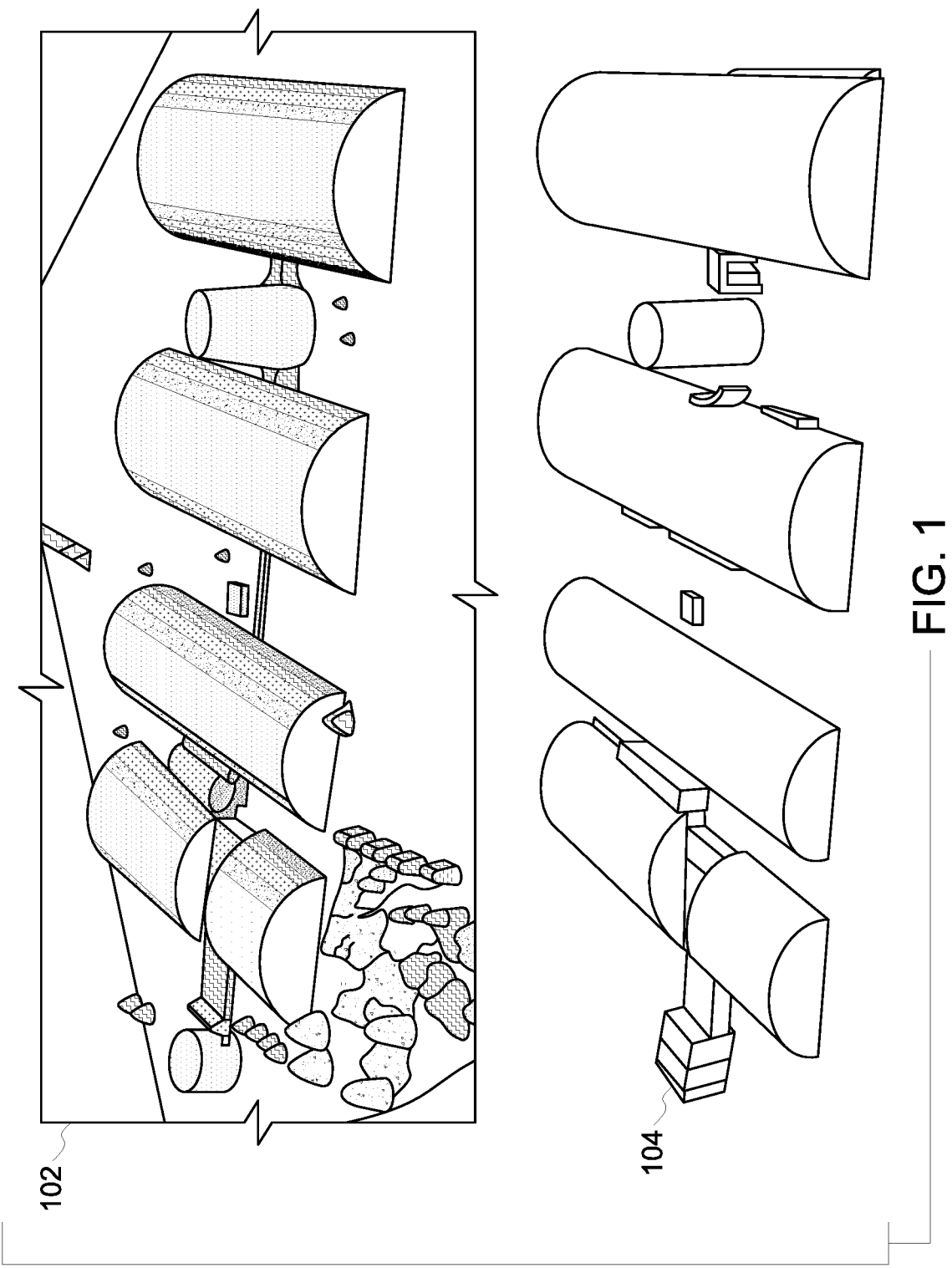
FIG. 1 is a non-exhaustive example of structures in a digital height model represented as a collection of geometric primitives, according to some embodiments.

In the following detailed description, numerous specific details are set forth in order to provide a thorough understanding of embodiments. However, it will be understood by those of ordinary skill in the art that the embodiments may be practiced without these specific details. In other instances, well-known procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Reconstructing realistic 3D building models from remote sensor data may provide benefits to several tasks including physical security vulnerability assessment, mission planning, and urban visualization, etc. A primitive based representation provides several advantages over the conventional polygonal mesh representation, such as regularization through prior knowledge, compact representation, and symbolic representation. However, building modeling and primitive fitting include challenging tasks that still need to be addressed, e.g., how many primitives are needed to represent the structure, how those primitives are arranged, and how to determine the best fitting.

A conventional approach utilizes a random sample consensus (RANSAC) to estimate the planes for building walls. However, RANSAC involves needing to solve many constraints and may run into instability when these constraints contain some amount of noise. Convex decomposition is another conventional approach for shape composition, including the decomposition of arbitrary 2D and 3D shapes into a minimum number of near-convex parts. However, the decomposition is not guaranteed to be formed by primitive shapes. Another conventional approach learns to assemble objects using volumetric primitives. The parameters of primitives (cuboids), such as the numbers, size and orientation, are estimated via a deep learning network and the obtained reconstruction allows an interpretable representation for the input object. However, it is an unsupervised approach that requires large-scale training images for each category and cannot accurately fit into the input 3D data. The reason is that this conventional approach attempts to approximate the shape of a building using essentially a square block (cuboid) as the only primitive, and the shape is approximated by stacking a collection of cubes to represent the volume. In particular, surfaces that are not 6-sided cubes can only be approximated by a collection of small 6-sided cubes. As such, there would need to be a large number of training cases to learn to stack these cubes in reasonable collections to approximate the desired shape. Moreover, as this method only applies to cuboid representations, it limits its ability to be used with more complex building shapes.

Embodiments provide a 3D building modeling module 1601 that executes processes for building modeling/decomposition and primitive fitting, where, as part of the building modeling/decomposition, a 3D building simulation module synthesizes training data for primitive-based 3D modeling. The synthesis process described by one or more embodiments may not incur costly annotations and may allow deep learning models to learn the shape decomposition in a data-driven manner. In particular, some embodiments provide a synthesis process to generate varied building shapes and types. By utilizing the synthetic data, the 3D building modeling module 1601 may formulate the building decomposition as an application of instance/same time segmentation and primitive fitting to decompose a building into a set of shapes. Each shape may then be classified as a certain predicted primitive type, and model fitting may be applied for adjusting pose and scale of the predicted shape. Building decomposition may decompose the buildings into a set of shapes, while primitive fitting may align the 3D building model to each shape.

First a dataset 1602 (FIG. 16) is received and a building footprint 1604 is obtained. The building footprint 1604 is decomposed into a set of shapes, each shape is classified, a roof type on each building is classified, and finally the classified detailed shapes and roofs are fit to the received data set 1602. Simulation and concepts of instance segmentation and same time segmentation are used to decompose a building footprint 1604 into a set of shapes. Each shape is classified and fit against a library of building and roof types. While the term "building" is used herein, embodiments may apply to any suitable man-made structure or other non-man-made structure that may require a different set of primitives (e.g., trees).

Data may be obtained from satellite imagery or other readily available data sources (e.g., mapping information, road maps, etc.). As a non-exhaustive example, the data sources may provide 2D and remote sensing data input and may include global satellite coverage (e.g., panchromatic, multispectral, SRTM), global data sets (e.g., maps and vector data), as well as other data. This 2D and remote sensing data input may be transformed into an intermediate representation to provide a surface model for the region of interest. The surface model is typically a dense 2.5D (2D xy grid—where each cell is the z height value) or 3D point cloud (where each piece of data is an xyz location+meta data (color, intensity, feature name, etc.) The representation may be easily overlaid with imagery; however, it is not a compact representation (2 to 4 orders of magnitude different), so it may be difficult to work with/reason over large-scale areas (e.g., visibility occlusion and access). The surface model may be in the form of 3D point clouds and digital surface models created from multi-view stereo reconstruction. Additionally in the surface model representation—where each datapoint is a 2.5D grid cell, or xyz point (3D point cloud)—the concept of object/and meta data must be represented with other dimensional constraints (such as duplicating a label on each point—or providing separate metadata with a coordinate scheme to group the elementary data together). To address these concerns, some embodiments may provide a functional model. The functional model may include object recognition, dimensional geometric primitives, compact 3D representation, and tagging with metadata. Primitive representation provides for a more compact metadata scheme. The functional model may enable large scale reasoning and continuous updates, as well as provide higher-order reasoning scalable to large areas. In embodiments the functional model may represent the data in a very compact representation, by replacing pixels in the images with 3D geometric shapes. The compact representation provides for: 1. easier data transmission, and 2. high order reasoning about shapes to understand an environment in which the objects in the regions of interest are located.

As used herein, and described above, "primitive" may refer to a simple 3D geometric object (e.g., boxes, rectangular prisms, cylinders, cubes, hipped roofs, gables, etc.) that may be expressed precisely with a low number of polygonal faces. The primitive may be as complex as needed, as it may represent a parametric modeling component that is meant to be a piece of a building. A more complex component may represent specific building constructs with fewer primitive components; however, it may be less likely to be used in general modeling. As such, there may be a tradeoff between decomposition and fitting against a library of reusable building blocks. Embodiments may provide for the piecing together of the simple shapes to build a more complex shape. It is noted that even the simple shapes are compactly represented as compared to a digital pixel representation.

Figure 2:
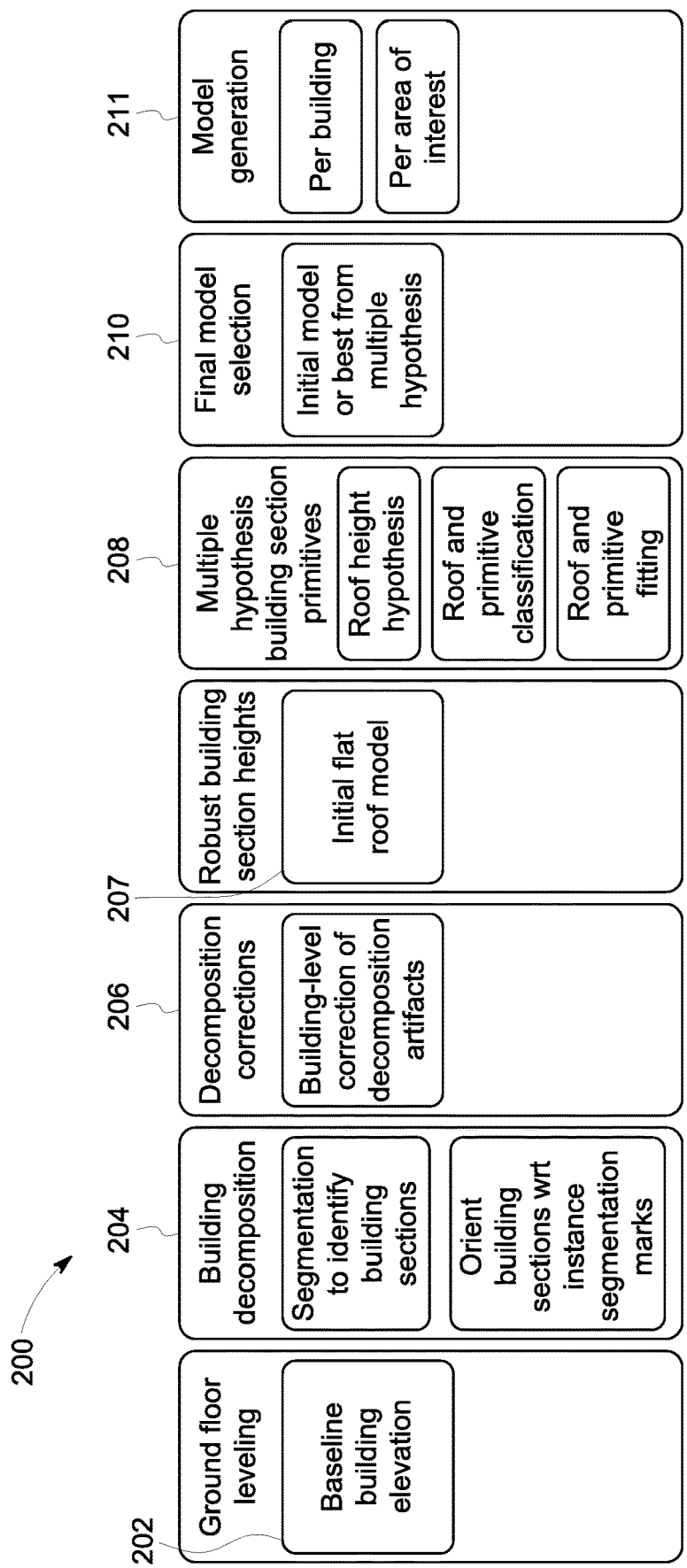
FIG. 2 is a process according to some embodiments.

The 3D or primitive modeling may be represented as including three main components: 1. Building simulation, 2. Building decomposition, and 3. 3D fitting. FIG. 2 provides an overview of a system process 200 for building 3D primitive models. A baseline building elevation (digital terrain model) 202 is estimated and the building model is referenced to this level datum. With respect to the second component, the output from a building footprint is combined with a height map for that footprint, and it determines how many structural elements ("shapes") (e.g., simple primitive regions) are in this 3D structure. The process of determining how many shapes are in the 3D structure may be referred to as "decomposition" 204. Then, in brief, and described further below, decomposition may be formulated as an application of cascading instance segmentation or same time segmentation, which may be extended to decompose a building into a set of shapes. The shapes may then be classified as primitives, as described further below. As a non-exhaustive example, if a building is L-shaped, with two gabled roofs that meet at 90 degrees, it may be desirable to break the building into two shapes, and model the building as two shapes, each with a gable. To improve the decomposition, a correction approach 206 may be used to fill gaps interior to a building between individual shapes. For each shape, primitive classification and fitting may be applied based on a multiple hypothesis approach 208. Part of the decomposition strategy involves figuring out what makes a good 3D volume to attempt to model from the primitives in the library. It may not always be obvious what is the best carving of this space. For example, if you have a hanger style roof (curve)—but end up carving out a space in xyz—that is too shallow in z, and you might think the top piece is a gable—sitting on top of one or more boxes representing the tapered vertical walls. To address this, embodiments take a multiple hypothesis approach 208 in carving out the volume (starting with an initial flat roof model 207)—by explicitly manipulating the z (and dependent xy)—to attempt different partitioning schemes—and then determining which representations best match the building structure. With respect to the third component, given the shapes, a type of shape is identified for the shapes, based in part on the first component, and one of the primitive models is fit to the shapes. The best fitting model may be selected 210 and the 3D model is generated and persisted in 211, as indicated by Model Generation. It is noted that while the 3D model may be in a PLY format, which is a particular file format for 3D models, other file formats (e.g., STL, OBJ, FBX, STEP, COLLADA, etc.) may be used.

Figure 18:
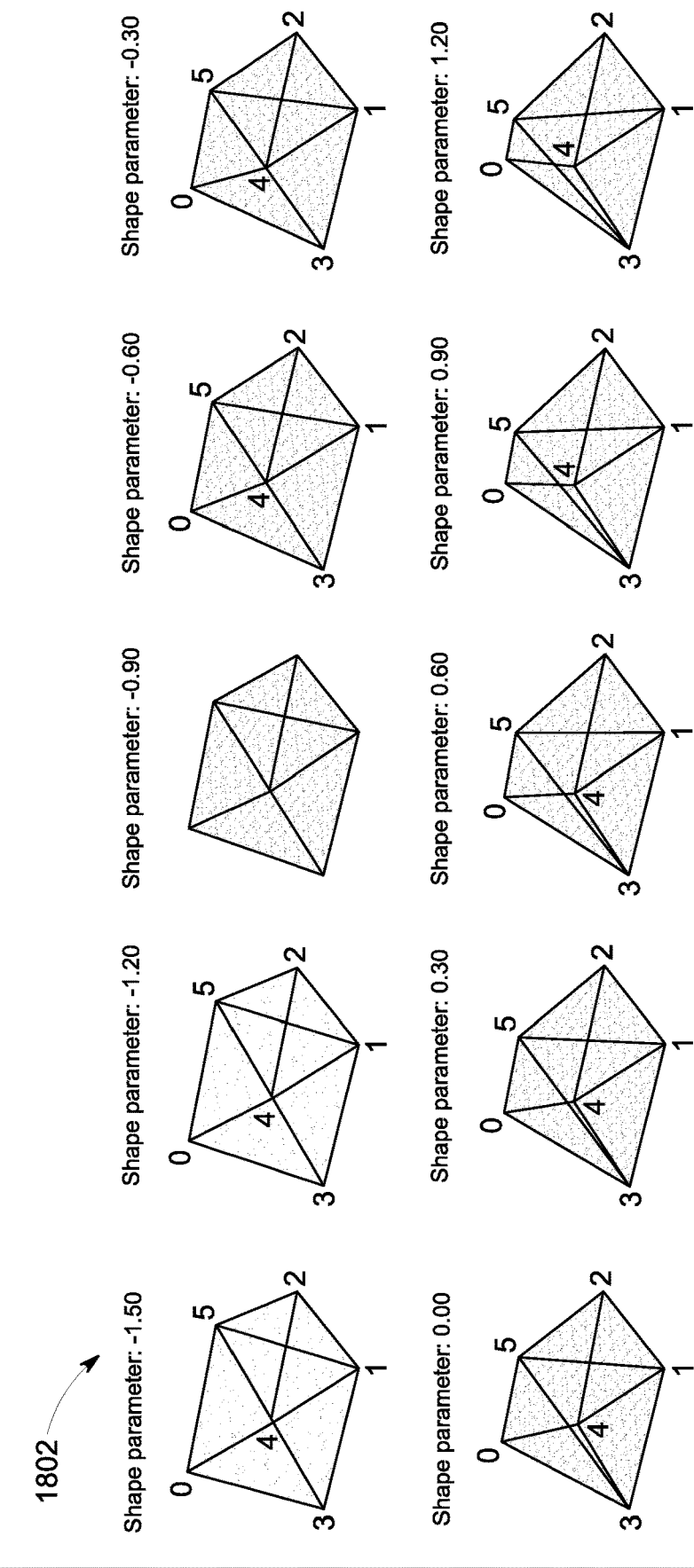
FIG. 18 is a non-exhaustive example of a point distribution model according to some embodiments.

When the data is received from the data source, buildings/regions of interest ("ROI") are identified. Once the buildings have been identified, this information may be used with a stereo map and height map for the buildings to generate a primitive model. The height map may be a pixel-based representation 102 (FIG. 1), and in some embodiments, the decomposition module 1606 may recognize more complex shapes in the height map 1605 and replace a portion of the height map with the recognized shapes via a decomposition process. The identification and replacement steps are iterative until the buildings and other man-made structures from the height map 102 are represented by a collection of geometric primitives 104 (FIG. 1). As a non-exhaustive example, some embodiments may recognize a number of points in the data as representing a roof gable. The points/pixels may be replaced with a primitive and ultimately a shape model 1802 that represents that gabled shape, having a height, a slope, a length, and a width. For example, FIG. 18 shows a hip roof point distribution model at various normalized shape parameter values and points on the surface of the model. Replacing the pixels with a primitive shape may provide a better/more compact representation of the data. Regarding the better/more compact representation, it is noted that each individual pixel may have errors associated therewith, so the replacement of the individual pixels with a bigger shape may provide a cleaner representation of the building/building shape with less errors. The compact representation may be desirable, as if the data had to be transmitted, for example, for situational awareness on a battle field, instead of sending large pictures with all of the pixels, a very compact representation may be sent of a given shape at the first location and a different given shape at a second location.

One or more embodiments provide for leveraging synthetic data as an effective approach for building decomposition and primitive fitting. One or more embodiments provide for a synthesis process that may generate building shapes and types in an iterative manner, which partitions the simulation region into randomly sized nonoverlapping regions and synthesizes different heights and primitive types for each region. One or more embodiments may formulate the problem of primitive-based 3D building modeling as an application of instance segmentation/same time segmentation, and primitive fitting to decompose a building into a set of primitive shapes.

The three components—1. Building simulation, 2. Building decomposition, and 3. 3D fitting, will now be described.

Building Simulation

A building simulation module 1608 is used to generate training data (simulated models 1609) for building footprints, height maps, and preferred building section decompositions. Embodiments generate building simulations to provide the training data to a machine learning environment to train the decomposition module 1606 to execute the decomposition. The simulation is the construction of buildings as a collection of primitive shapes. The need for the building simulation data is that there is not a suitable library of examples that indicate a building made of a given number of shapes and the overall building shape associated with those shapes. The building simulation may include more than just building geometry. In particular, it may also include the height maps that may be input to the decomposition process. As such, the building simulation module 1608 may execute a process of generating the height maps for every pixel and including properties that mimic how a sensor recording the image behaves in terms of noise in those measurements to build the final simulation. It is important to note that the simulation generates the same noise characteristics as the satellite sensor data and other data, so that the machine learning algorithm of the decomposition module 1606 that is being trained to break apart (decompose) shapes recognizes the features of buildings and also the noise that it expects to encounter. In the simulated models 1609, the same sort of noise (the noise is an approximation) the decomposition module 1606 would encounter in a real image is included. It is desirable to have appropriate noise in the simulated model 1609 to facilitate the mapping to actual data in a live environment which is input to the decomposition module 1606 with noise. In practice, the amount of noise is a function of the construction of the building, so the simulated model 1609 may be generated under a variety of conditions, to provide a more robust training data.

At the end of the simulation, the building simulation module 1608 outputs the geometry (e.g., shape, etc.) for the building in terms of a simulated model made up of the appropriate shapes ("building decomposition"), as well as what the corresponding height map would be for that building. A height noise model and boundary perturbation may be included in the generation of the simulated models to make the data noisy, because that will make the boundaries fuzzy, like the real-time data. The building simulation module 1608 may include a random building section definition (domain partitioning and merging, stacked, step pyramid, overlapping and angled, curved, etc.), a building section property assignment (e.g., number of floors, floor to floor height, roof, primitive, etc.), an ideal height map generation (rendering of the building), an image-based sensor model perturbations (e.g., height noise model, point spread function, boundary perturbations), and simulation outputs (e.g., simulated height map, and ground truth building decomposition). It is noted that these methods may generate 40K or more buildings, and then this data may be used to train the decomposition module 1606.

Figure 3A:
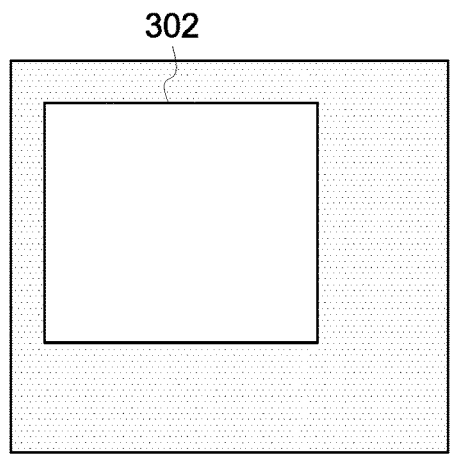
FIGS. 3A-3C are examples of segmentation according to some embodiments.
Figure 3B:
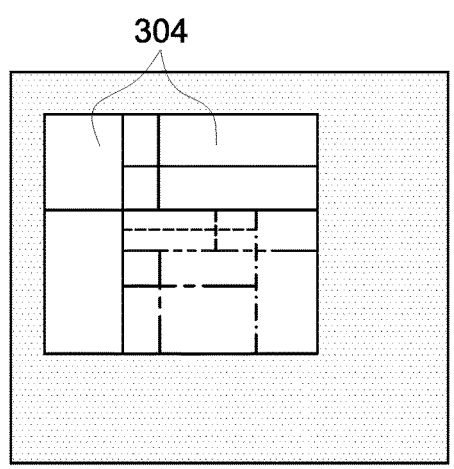
Figure 3C:
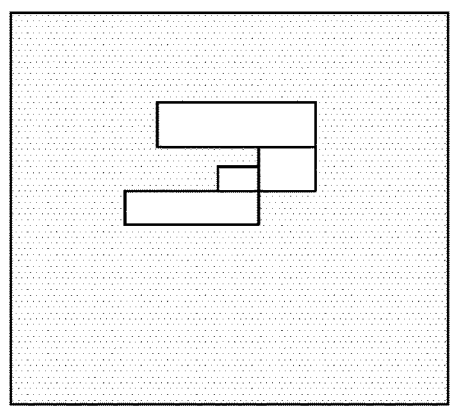

Regarding the building simulation process executed by the building simulation module 1608, to simulate a building shape, a region of space may be defined, and the region may be recursively randomly partitioned. In a manner similar to constructing a quadtree, a point within the region may be randomly sampled and the region may be divided into a number (e.g., four) of rectangular regions. A random rectangle 302 is shown in FIG. 3A. This process may be iterated to partition the region/rectangle into randomly sized nonoverlapping rectangles 304 as shown in FIG. 3B. Then a subset of the rectangles may be randomly selected to form the building shape, and other rectangles from the surrounding terrain may be discarded, as shown in FIG. 3C. The building rectangles, while forming a realistic footprint for a building, may typically have more primitives than necessary to represent the building. The selected collection of rectangles may be simplified by merging adjacent rectangles that completely share an edge, as also shown in FIG. 3C, to form a larger rectangle. Random heights may be assigned to each building section and roof models may be assigned to each section. It is noted that other merging/simplification strategies may be used. Namely, a second strategy that makes a complete pass through current potential merges before selecting a merge that results in the largest rectangle; and a third strategy that searches over all possible merges using an entropy criterion to select the best collection of merges. With the third strategy, the entropy criterion may balance the number of primitives against the distribution of primitive areas, resulting in collections of primitives biased towards a uniform distribution of sizes.

Given a building shape, the appearance of these buildings may be simulated in stereo reconstructed images using an image-based approach. The approach is motivated by fractals, randomly selecting points on the boundary to distort by a random amount, iterating through a range of distortion scales, and blurring with a point spread function. In embodiments, the simulations may be extended to include more physics-based simulations, where the noise distribution for reconstructed positions is modeled, complete with the reconstruction biases imposed by satellite directions. The stereo simulation may be used to simulate how a building will appear in a stereo reconstruction to produce a new height map. First, an ideal height map for the building may be generated. In one or more embodiments, a number of floors may be randomly assigned to each part of a building, with the floor to ceiling height based on whether the building is commercial or residential. The simulated model 1609 may model the appearance between building sections of different heights, and may perturb the sampled heights of the building sections and smooth them with a point spread function. The building simulations may include a variety of roof types (e.g., flat, shed, gabled, hanger, dome, etc.). The roof simulations may be parameterized for pitch and roof height above the baseline building height. As with the footprint simulations, the roof simulations may include image-based simulations of the sensor noise and point spread function.

Figure 5:
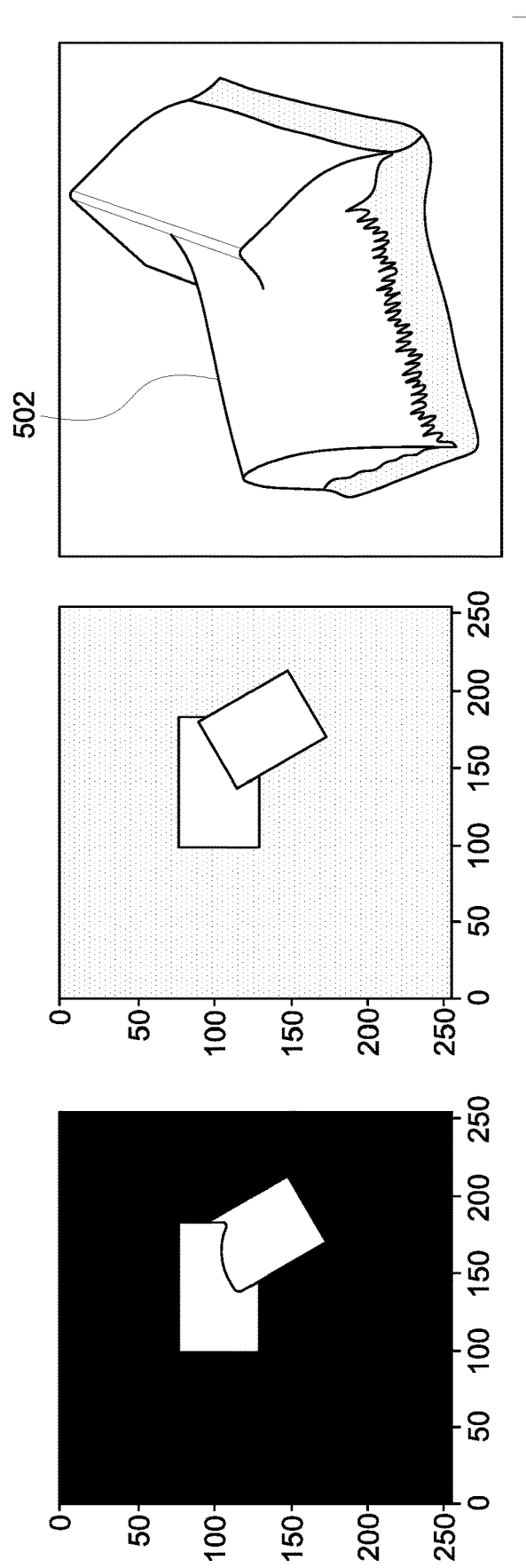
FIG. 5 is a non-exhaustive example of building designs according to some embodiments.

In some embodiments, the simulated models 1609 may include general building designs as well as specific building designs. Two non-exhaustive examples of specific building designs include a step pyramid design 402 and wings in the structure that are not necessarily set at 90 degree angles from the adjacent section of the building 502, as shown in FIG. 4 and FIG. 5, respectively. Step pyramids may be randomly generated with different sizes, different number of layers, different shapes for the top layer and different roof types.

Additionally, the steps may be in both the width and height directions of the building footprint or along just the width or height direction. When simulating the winged building design, the angle between the wings may be a multiple of fifteen (15) degrees, following traditional building principles.

In some embodiments, the simulated models 1609 support the modeling of stacked structures. There may be two scales at which primitives are stacked to model a building. With a first scale, a course stacking applies the existing building simulations recursively. After a base 2D building footprint and decomposition is defined (described further below), sections of the footprint are selected and 2D footprint and decomposition is defined within the domain of each of the selected sections, as shown in FIG. 3. This second generation of a footprint is "stacked" on top of the first. This process may be repeated, stacking a third generation on top of the second, etc. The complexity of the building footprint at each generation may be separately controlled by specifying a detail level. In some embodiments, the building simulation module 1608 may provide for: the random selection of the number of generations of layers of stacking; the random selection of the identity of which building sections will be stacked; the random selection of the detail level of each generation of stacking.

Figure 6:
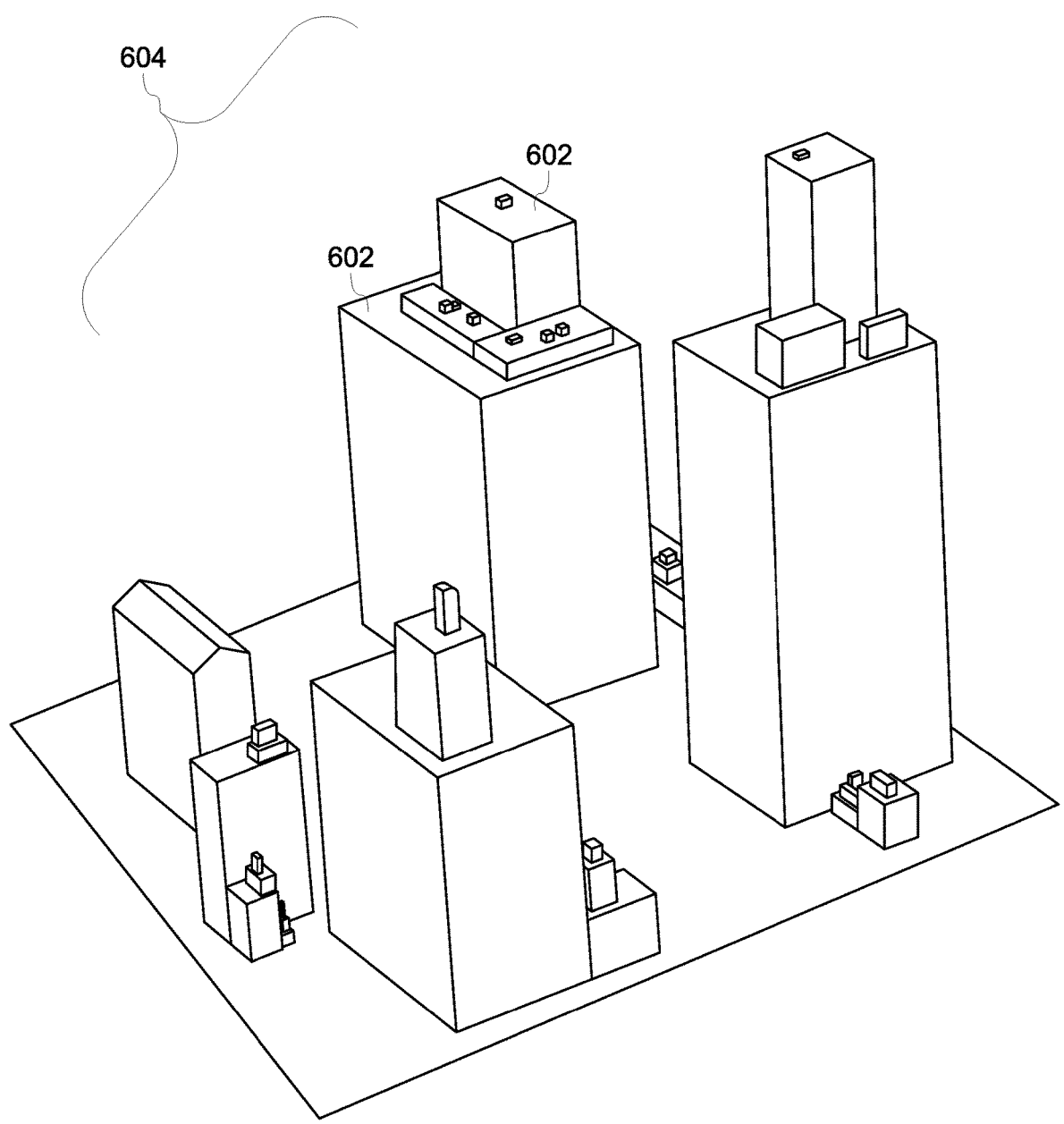
FIG. 6 is a non-exhaustive example of stacked primitives according to some embodiments.

With a second scale, primitive models and rooftop structures, such as air handlers and vents, are stacked. With the second scale, building sections that do have children layers are attributed with additional primitives representing rooftop structures. FIG. 6 shows the stacking of primitives 602 to form more complicated building structures 604. Hipped roofs, added point-in-shape queries to ensure proper stacking of rooftop structures on non-rectangular building sections, simulated variability in the floor to floor heights, and height map generation routines for gabled and hipped roofs may be included in the simulated models 1609.

In one or more embodiments, random Gaussian noise may be added to the simulated heights. In one or more embodiments, the building simulation module 1608 may use a stochastic process (or other suitable process) to assign a noise level to each rooftop and all surfaces in the z-plane, instead of using a single noise level for all buildings. The boundaries of the building and the boundaries between building sections may be perturbed by randomly dilating points along the height map to model the boundary properties observed in stereo reconstructions from tools like s2p. Finally, the noisy and perturbed height map may be smoothed to model the correlation that may be seen in the output of satellite stereo reconstruction tools like s2p.

To generate training data for instance segmentation and same time segmentation, one or more embodiments may use the building simulation module 1608 described above. Both the idealized and noisy boundary images may be included in the training data. The simulated models may be randomly rotated between 0° and 45° to include, in the training data, primitives with arbitrary orientations and varying noise levels. It is further noted that since the building simulations include shapes of random aspect ratios, the simulated buildings may not need to be rotated further than 45 degrees. As a non-exhaustive example, a total of 40,000 simulated buildings may be generated. Other suitable numbers of simulations may be generated. To train the network, a pre-trained model from the COCO dataset may be used, and all the layers in the CNN feature extraction may be frozen and other layers are trained for 60 epochs. Finally, all layers are fine-tuned for another 60 epochs. In embodiments, instead of training the network with a pre-trained model from the COCO dataset, the training may be from scratch to achieve better building-specific features/results.

In one or more embodiments, the generated training data may be included in a library 1610, which may be used by the decomposition module 1606 for instance segmentation 1611 and/or same time segmentation 1612, described further below. The library 1610 may be a database of simulated model images where all heights are measured in meters (or other suitable measure), including simulations that 1. Vary floor to floor height designs, 2. Vary the height noise levels for each separate rooftop, 3. Include instances of stacked building designs, 4. Include instances with rooftop structures, 5. Include instances of step pyramid designs, and 6. Include instances of angled (wings) and overlapping building designs. The training data includes the simulated model images and the primitives used to create the simulated model images. Once trained, via any suitable machine learning technique, the decomposition module 1606 when given a building image, may decompose the image into the requisite primitives.

Building Decomposition

Figure 7:
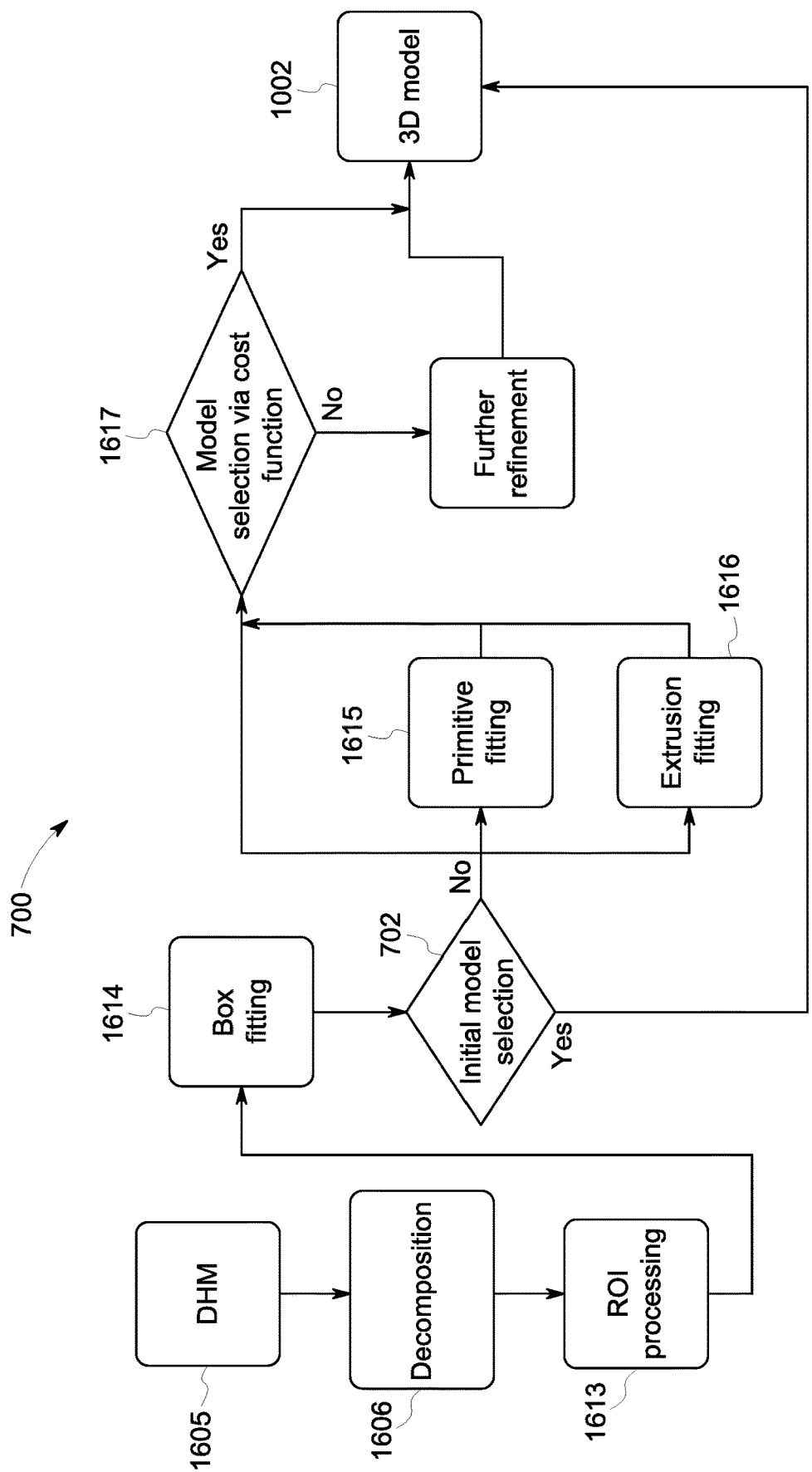
FIG. 7 is a process according to some embodiments.

FIG. 7 provides an overview of the decomposition and construction process 700 that will now be described.

Building decomposition includes dividing a height map 1605 into a plurality of shapes 804 (FIG. 10A) and then determining for each shape, which different model fit (e.g., box, pyramid, dome, and gable) is a best fit. To decompose a building into a set of shapes 1002, one or more embodiments may use "instance segmentation" 1611 whereby the application of a mask R-CNN is cascaded to partition a building into a set of shapes. As used herein, Mask R-CNN refers to a particular network structure that performs classification, region proposal and object segmentation. In some embodiments, the architecture of the Mask R-CNN may be modified to take two images as input (a height map and a Mean Shift result), generate features from these two input sources separately, then combine the features at a point along the backbone network for Mask R-CNN. The combined features may improve the building decomposition by improving the building section segmentations.

With instance segmentation 1611, one of the instances with the largest intersection over union (IoU) (e.g., biggest structural element/shape) compared with the original mask is selected 802 (FIG. 8A). That instance shows the bounding box for a shape after the first iteration. Then, that instance is removed from the data as shown by the blacked-out area in FIG. 8B in place of the selected area 802 in FIG. 8A. Then the next biggest shape 804 is identified and removed from the data. In this way, the individual shapes 804 are whittled away from the original mask in priority order. This is a greedy approach to decomposing the building into a set of shapes. As a simple non-exhaustive example, the buildings are composed of a set of rectangles. Other shapes may be used in the decomposition. To decompose the building, then, the decomposition module 1606 takes the building footprint 1604 and height map 1605 and divides the building into a suitable set of rectangles 804 shown as the final decomposition in FIG. 8C. As described above, the decomposition module 1606 was trained with the simulated models 1609, so that when the decomposition module 1606 receives a height map and a footprint, the decomposition module 1606 uses machine learning and the library 1610 of trained data to find the shapes 804 that define the individual sections of the building. Other embodiments may use a decomposition process without instance segmentation, referred to herein as a "same time segmentation" 1612 decomposition process. In the same time segmentation 1612, the building is still decomposed into a plurality of shapes 804, but instead of finding one shape at a time, all of the shapes are determined at a same time. With the same time segmentation 1612, the decomposition module 1606 determines how many shapes 804 (e.g., rectangles, triangles, circles, dome, gabled roof, cube, sphere, box, etc.) fit in the building at a same time. In one or more embodiments, with same time segmentation 1612, rather than carving out one shape (e.g. largest shape) for modeling, completely removing from the structure to later iterate over the remaining pieces, instead the same time segmentation process attempts to recognize the stacked nature of building construction. By recognizing all the sections of a building, the same time segmentation 1612 then begins modeling the tallest sections first, defining the geometric shape of the region protruding above lower regions. With the taller sections modeled, the same time segmentation process may attempt to then fill/blend the remaining regions, such that the lower region would otherwise represent a complete structure that may be modeled as a complete structure, without needing to consider the already modeled structure stacked above this region. In both the instance segmentation 1611 and the same time segmentation 1612, the decomposition module 1606 is decomposing the building into shapes 804 based on the training data in the library 1610 generated via the building simulation module 1608 (e.g., when you have an ROI X, it should be decomposed into these given shapes). The module has been trained so that the buildings may be decomposed into a set of individual shapes, based on the shapes included in the training data in the library 1610.

As part of the building decomposition, angular constraints may be included in the refinement of the building decomposition in some embodiments. Building construction is typically composed of angles aligned to 15-degree increments (e.g., 90, 60, 45, 30, 15). The digitization process maps the continuous scene into a discrete set of finite values and this mapping process may introduce approximations. The angular constraints may clean up noise and quantization errors from the dense pairwise and multi-view stereo reconstruction. For a given building, these constraints are assumed to be consistent throughout the complete structure. As part of the angular constraints process, before attempting to model shape instances, the primary building axis, and the complete set of angles that define the structure are first established. If a building is found to contain a number of angles around 90 degrees (e.g. 91, 89, 92, 88), based on a-priori knowledge of construction techniques and the source of reconstruction error, adjustments may be made to the dense reconstruction to satisfy a 90 degree angular constraints. (Note: any angles falling outside a configurable threshold may not be included in enforcing of the angular constraint). With a single shape, for example, the primitive shape fitting process described in embodiments may be sufficient in approximating the representation with the parametric primitive; however, as the shapes are modeled one region at a time, where the angular constraints are applied to the entire structure, by including the angular constraints, embodiments are able to more accurately capture the angular relationship between individual shapes representing the building composition.

Figure 10A:
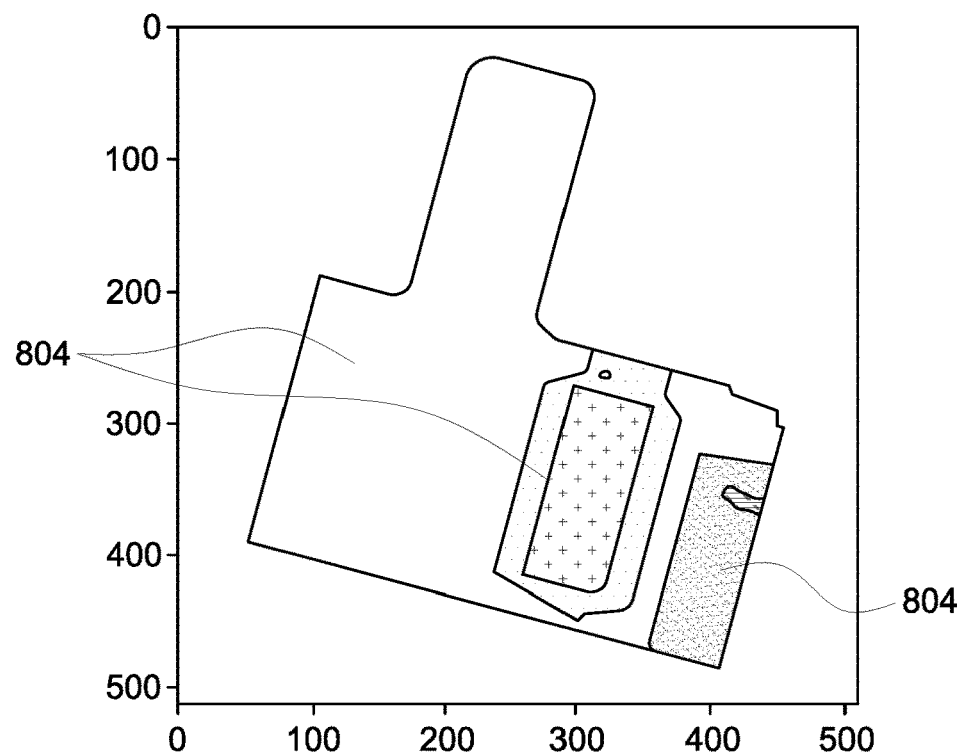
FIGS. 10A-10C are a non-exhaustive example of final building decompositions, models, and textures, according to some embodiments.
Figure 10B:
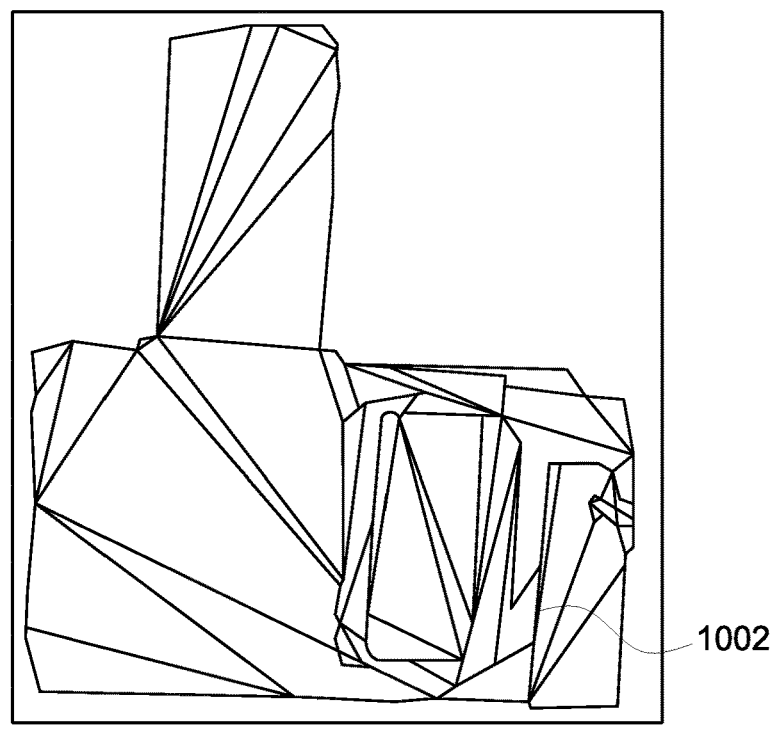
Figure 10C:
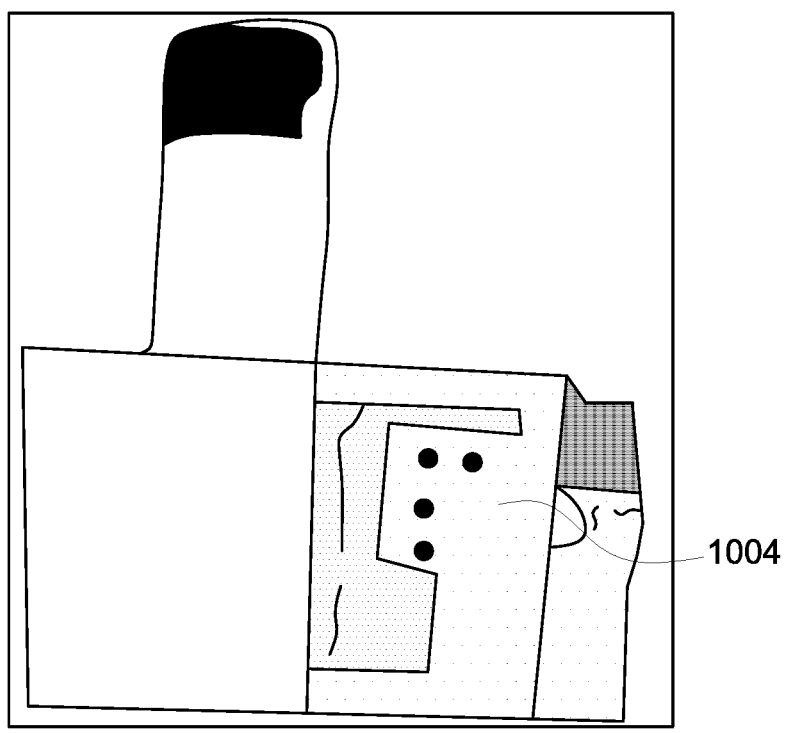

After building segmentation and building instance identification, described below, are performed, the decomposition module 1606 may crop and scale the height map for each building instance to a normalized space. To facilitate analysis by the neural network, a fixed input size is received thereby, which means that the buildings need to be scaled (up and down) and cropped to fit within a normalized input space for the network. It is noted that this cropping/scaling are independent of the angular constraints. This normalization provides a common input representation for different sized buildings enabling the DNN (Deep Neural Network) to have a fixed input size. The normalized height map is then decomposed into identifiable building components using a combination of Mean shift clustering and Mask R-CNN. To correct for errors in the segmentation, a-priori knowledge of building construction is applied to refine the edges. Each component mask is examined to extract a list of all straight edges identified by RANSAC. Edges that are found to intersect at 15-degree increments from one another are identified as possible refinement candidates. Edges that do not meet the intersecting angle criteria will not be selected and will therefore not be refined. All edges meeting the selection criteria are then snapped to 15-degree constraints, and a final regression is applied to the collection of selected edges to provide a best fit to the 15-degree construction constraint. As a non-exhaustive example, FIG. 10A shows a final building decomposition with each differently shaded region representing a shape 804 within the building to be modeled. FIG. 10B shows a resulting 3D model 1002. FIG. 10C shows a final texture model 1004.

ROI Pre-Processing

After the building has been decomposed into a suitable number of shapes 804, the ROI/building may be pre-processed. The pre-processing may be a correction process 1613 that includes identifying individual pixels that may have been missed by the instance segmentation 1611 and the same time segmentation 1612, and merging the identified pixels with an appropriate shape, so that the decomposition is more complete.

Pre-processing may also include removing stacked structures inside a ROI. Buildings may include building sections on top of building sections, or may have areas on top of the building that are separate objects (e.g., air handlers, etc.). When a building is stacked, the height of each stacked component may be estimated. Estimating the height for the upper structure includes the height estimation as provided by the digital height model (DHM) 1605, which is important to the decomposition module 1606. As described above, once unstacked, the lower section may be modeled as a complete shape that the upper structure would sit on. As such, the lower structure is filled/blended to represent a complete structure without the stacked component and is modeled independently of the upper structure. To estimate the height for the lower structure, the stacked structures may be identified/detected and removed, which may be important for accurate height estimation. In some embodiments, Mask R-CNN may be combined with a Means Shift process to identify the stacked structures. The Mask R-CNN may be trained to identify an object class (roof type—flat, shed, gabled, hipped, pyramid, dome, hanger). The Mask R-CNN segments may then be used by the decomposition module 1606 model to identify which Mean Shift segments should be merged together and potentially cropped by Mask R-CNN segments. Mask R-CNN groups the non-flat segments from Mean Shift, while Mean Shift provides sharp boundaries and complete segmentations, to ultimately identify the different stacked structures.

Figure 9A:
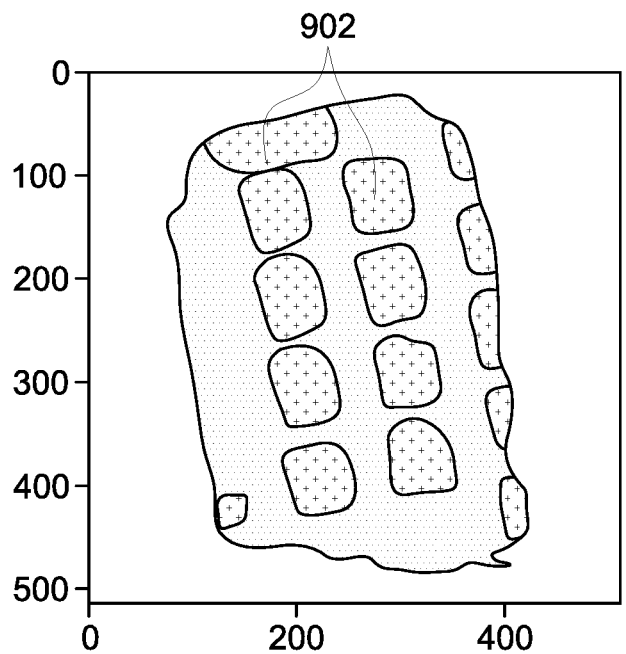
FIGS. 9A-9B are a non-exhaustive example of a mask according to some embodiments.

For example, when fitting the structure to the primitive shapes, if the stacked structures were included, the primitive fitting module 1615 would try to fit those stacked structures, which may not provide an accurate representation of the building. For example, as shown in FIGS. 9A and 9B, with the stacked structures 902, the height map may provide a height estimation of the building as 18 meters (FIG. 9A).

Figure 9B:
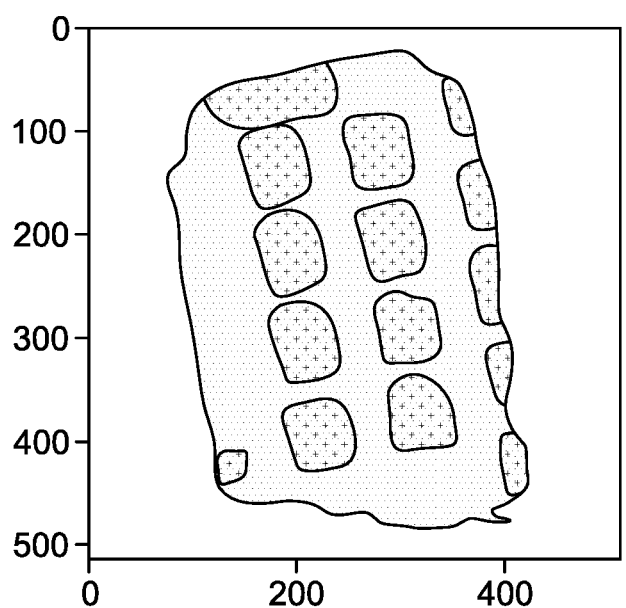

However, by removing the stacked structures 902, as indicated by the more uniform shading of the large rectangle shown in FIG. 9B, the height estimation of the building is 14 meters. By removing the stacked structures, the primitive fitting module 1615 may fit a simulated model 1609 to the base of the building. The decomposition module (which is isolating the individual sections to then pass into the shape fitting module) may determine an appropriate height for the stacked structures at another time. It is noted that the decomposition module is not discarding the stacked structures 902, rather, it is isolating the shapes to focus on one at a time. It is further noted that the estimated height area remaining after the stacked structures 902 are removed may be filled in using other pixels. In embodiments, when a stacked component is removed for fitting—the lower component is filled in to represent the supporting structure that the stacked component will sit on. The lower component is filled in based on the adjacent perimeter pixels. This is done so that the lower structure can be modeled independently of the upper structure.

After the ROI preprocessing, the decomposition module 1606 may execute a box fitting process 1614 on the preprocessed ROI image. The box output (not shown) from the box fitting process 1614 may be a hard-coded rectangular volume representation that may also be arrived at with the normal primitive fitting process, as there is also a parametric rectangular shape in the library. The box may be an alternative way of representing the shape. The primitive fit and "box" representations may represent alternative hypothesis (per the multiple hypothesis approach 208) that may be evaluated against a dense model using a 3D IoU metric. The shape having the best metric may be selected (discarding the other representations). As described further below, the box fitting process may be used as an optimization. For example, the box fitting process 1614 may be tried first, and if a high enough 3D IoU metric is achieved, the primitive fitting process may be avoided.

3D/Primitive Fitting

Figure 11:
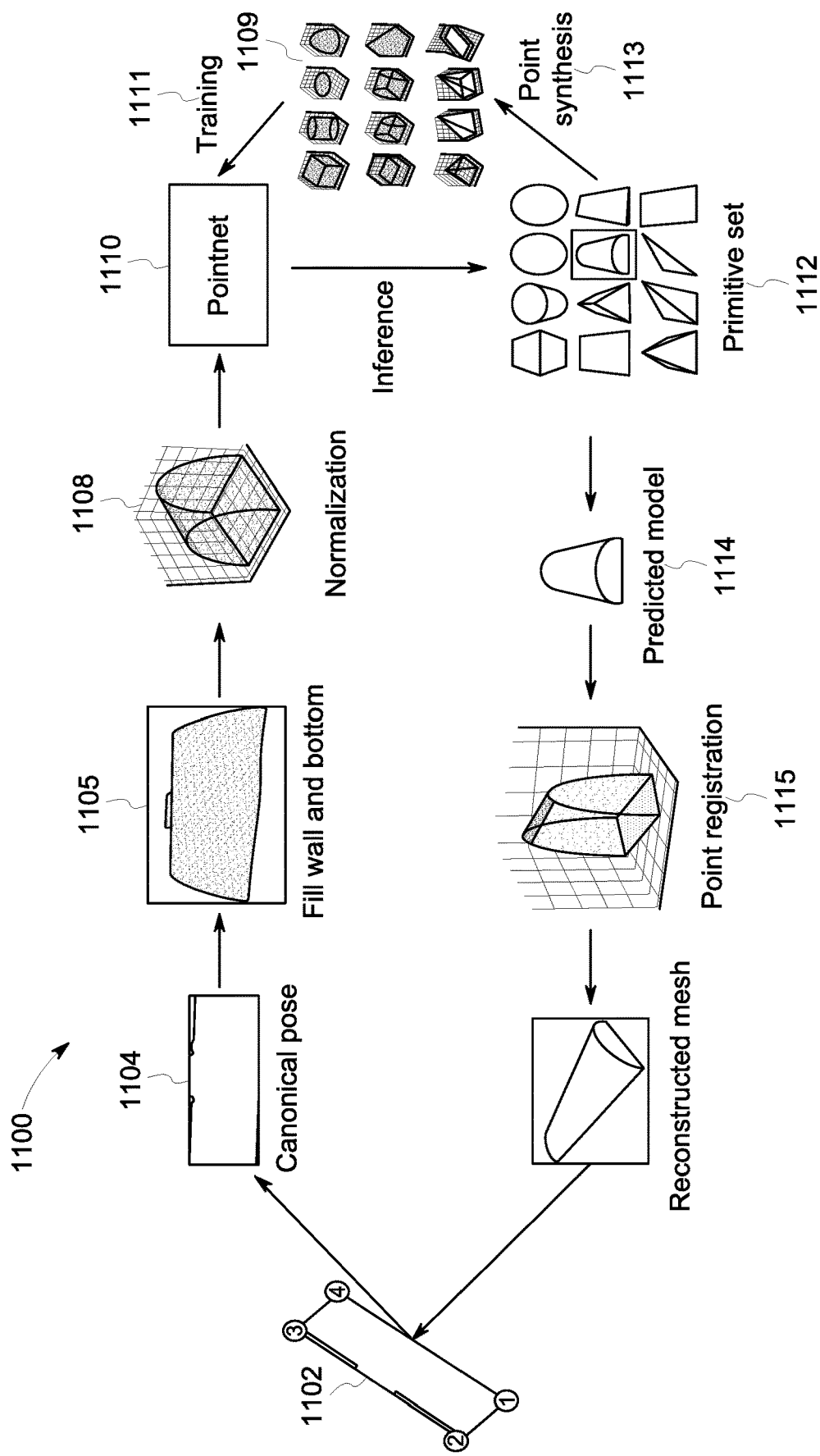
FIG. 11 is a process according to some embodiments.

A primitive fitting module 1615 may next apply a primitive fitting process 1100, as shown in FIG. 11. With primitive fitting, the focus is on identifying in detail which shapes represent a given building, and a final geometry of the building or shape (e.g., the compact representation for that shape/region). The fitting process is done for individual sections (where a building will be comprised of one or more sections). The composite set of shapes may represent the building.

Figure 12:
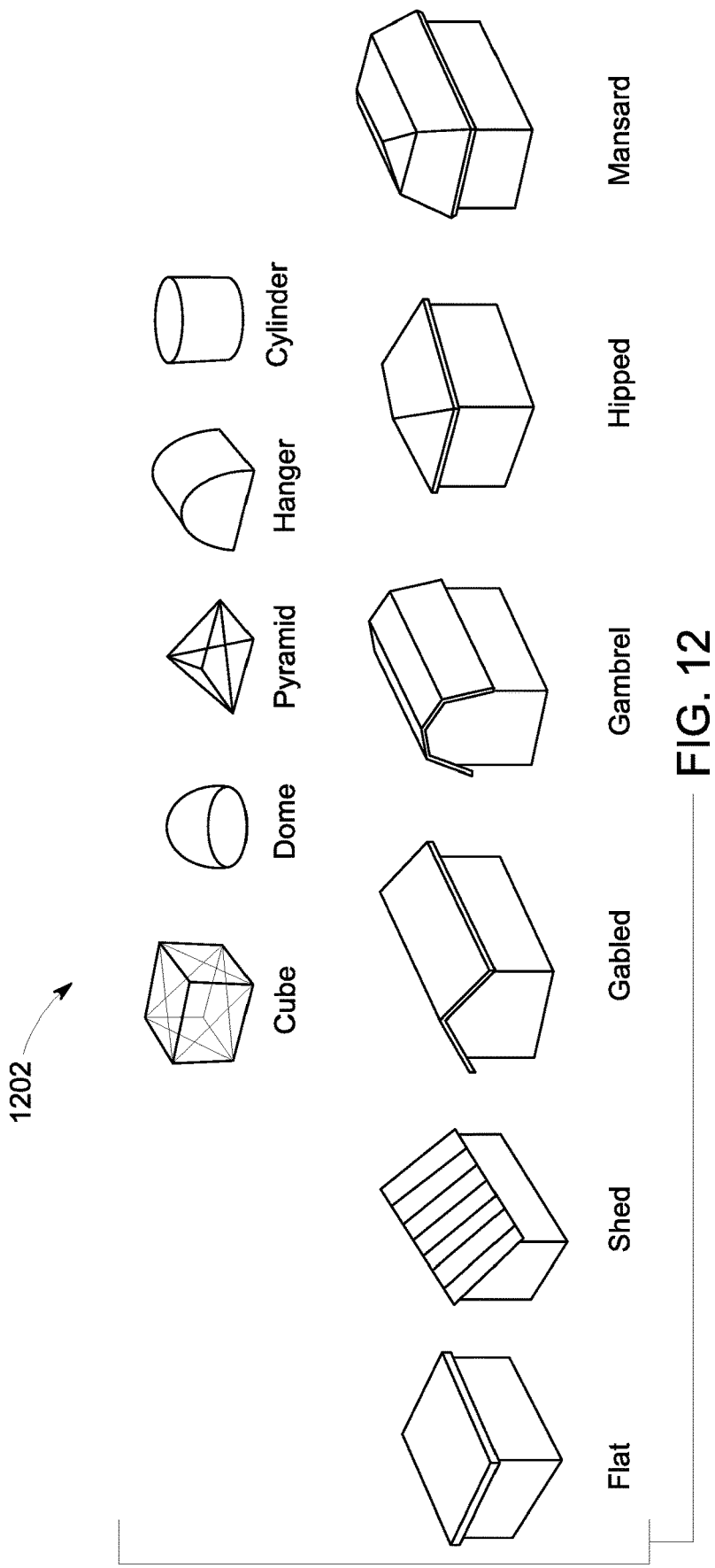
FIG. 12 provides non-exhaustive examples of roof types, according to some embodiments.

In one or more embodiments, a primitive fitting process 1100 may include two main parts: primitive classification and primitive fitting. With primitive classification, the roof types are estimated. Primitive classification is part of the multi-hypotheses approach, where there is an attempt to constrain the shape fitting problem to a set of shapes identified by the classifier. This classification is determined from the dense model, which therefore represents the roof or topmost building surface. With primitive fitting, the estimated roof primitive is aligned to an input point cloud 1102. While the fitting technique described herein is predicting shape based on a collection of points (e.g., using pointnet or pointnet++), other suitable fitting techniques may be used. The dense model is uniformly sampled to construct a sparse point cloud. The point cloud is sampled from the dense surface model to reduce the representation. It is noted that the point cloud may come directly from a point cloud representation based on the 3D information source (never having to go through a dense surface map). The surface map may be a dimensional reduction to a point cloud. The roof type 1202 may be one of flat, shed, gabled, gambrel, hipped, mansard, as shown in FIG. 12, or any other suitable shape. With primitive classification, each shape (model of sparse points that would otherwise lie on the surface of the shape) may be re-oriented into a canonical pose 1104 to facilitate the analysis. As used herein, the canonical pose represents a normalization technique to simplify the processing (reducing the number of possible orientations that a shape may be in for the purposes of fitting). Each shape has a primary axis that the shape is aligned to. The parametric elements within the primitive set also contain a primary axis that the shape aligns with. After fitting, the modeled region will be returned to the proper orientation to represent the region being modeled. With primitive classification, the class of geometric shapes to fit to a set of data is selected. With the primitive fitting, also referred to herein as "registration", the selected geometric shape is aligned to the set of data points. The task with registration is to estimate how a canonical shape 1104 is positioned and oriented with respect to the point cloud 1102. With registration, the problem may be posed as a function minimization problem of minimizing an error norm, for example L2 or least squares, of the model surface to point cloud data, and optimizing over a parameterization of an affine, similarity or rigid transform. Another part may include estimating any parameters of the geometric shape beyond those needed to align. Flat, shed, gabled, domed and cylinder primitives may be fit directly via the registration process. However, hipped, gambrel, mansard and other more complicated primitive geometries may not be fit simply through registration and alignment. These primitives may have additional parameters that are not spanned simply by an application of an affine transform to a canonical model. However, this other part may still be posed as a function minimization problem of minimizing an error norm of the model surface to the point cloud data. However, here, the optimization is not over the parameterization of an alignment transformation, but rather over the parameters of the shape. It is noted that while the process 1100 describes first classification and then registration, these steps may be addressed in a variety of sequences. For example, one can first classify the type of geometric shape, then register and fit or one can register and fit all the models then select which model best fits the data.

To fit the model to the point cloud data 1102, the primitive fitting module 1615 fits model parameters to the point cloud data 1102. In the non-exhaustive example shown in FIG. 13, the hipped roof 1302 has four parameters (width, length, height, length shift) and the mansard roof 1304 has seven parameters (width, length, height shift 1, height shift 2, width shift 1, length shift 1, length shift 2). It is these parameters that need to be estimated to fit the model of the data.

However, in one or more embodiments, the shapes may first be rescaled non-uniformly to fit within a cube defined by [−1,1]. This rescaling eliminates many of the parameters from needing to be represented in a Point Distribution Model. It is noted that the regression occurs in point space, which represent a sparse sampling of points on the surface of the primitive model (this is the point distribution). For example, in the normalized space, the hipped roofs and 8-sided pyramid roofs each just have a single parameter. Second, the shape parameter b may be separated into two vectors—a constant vector of eigenvalues and a variable vector of normalized shape parameters. Rescaling the shape parameters to exclude the eigenvalues helps further standardize the fitting (i.e. setting parameters for optimization). Normalized shape parameters are rescaled by the eigenvalues to reconstitute b during fitting. Third, the search of normalized shape parameters may be constrained to [−1.5, 1.5] (the equivalent of 1.5 eigenvalues of deviation). This constraint keeps the Point Distribution Model comfortably within the space spanned by the exemplar shapes. In other words, we do not try to extrapolate shapes outside our exemplar set.

Figure 13:
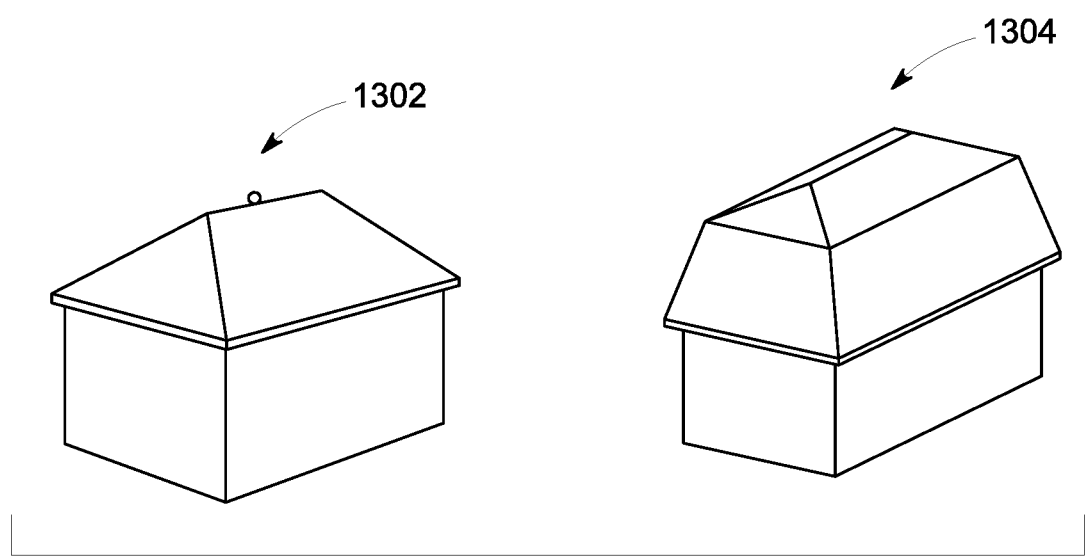
FIG. 13 is a non-exhaustive example of a hipped roof and a mansard roof, according to some embodiments.

As part of the classification, the missing sides/bottom of the decomposition shape may be filled in 1105 to complete the shape and increase the successful matching to a shape in the library 1610. It is noted that the filling of the missing sides/bottom may be a regularization technique. For example, when a section is removed for fitting, this section may have missing sides/bottom resulting from carving out the shape from the working set of remaining shapes in the decomposition. As a non-exhaustive example, if you were to carve out a piece of pie—the radial walls of the pie-piece would be void (as there may not be any internal representation of the shape—only the complete outer surface). Embodiments fill in any voids introduced in the carving, as if it were a solid shape, as this is what the library is composed of (set of solid shapes) to simplify the fitting/matching process. In one or more embodiments, the shapes used to train the simulated model 1609 are complete shapes with sides, tops and bottoms. However, the shapes determined by the decomposition module 1606 may not have bottoms because they are next to another piece. As a non-exhaustive example, with the height map, the measurements are provided from the roof of the building. While, as shown in FIG. 13, the roof may flow into the top story of the building, the roof is an isolatable piece. So, the data is normalized 1108 to determine the roof shape by providing a bottom to the area just below the roof. As described above, this normalization provides a common representation to match against the library.

Figure 14:
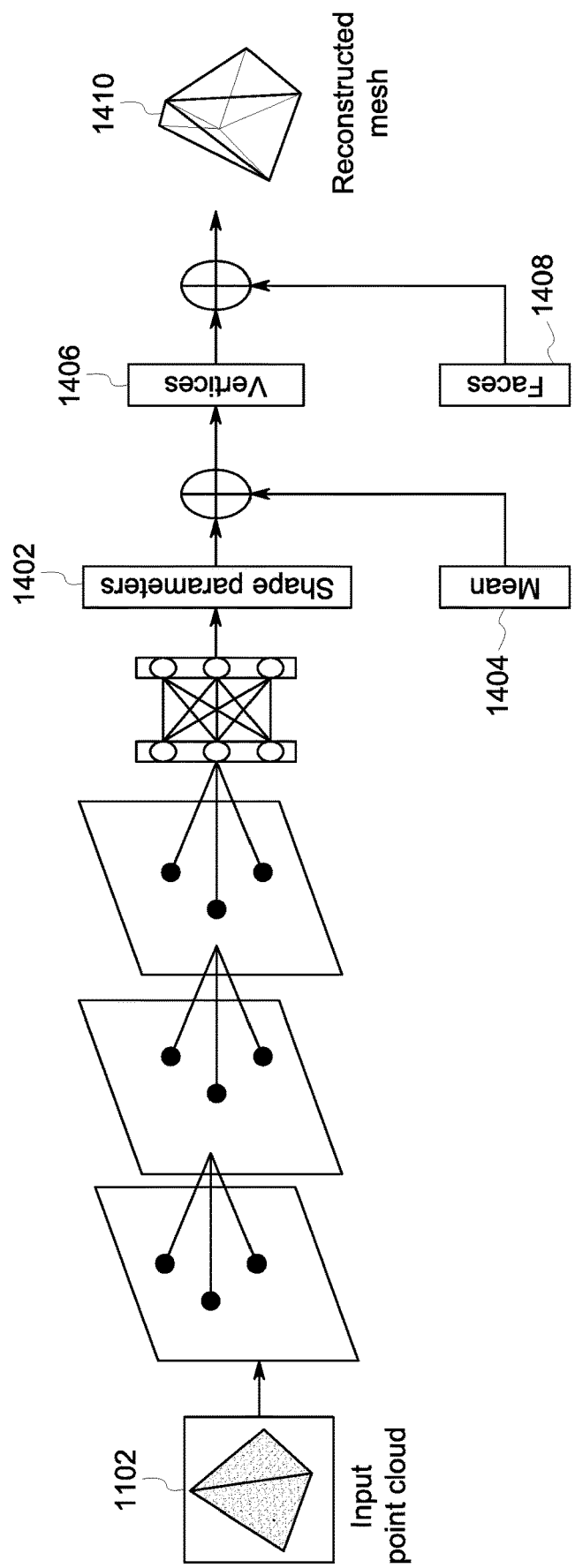
FIG. 14 is a process, according to some embodiments.

The normalized data 1108 may then be received at a primitive classification model, shown herein as point net 1110, to estimate the roof type. As used herein, the terms "point net" and "point net primitive model" and "primitive model" may be used inter-changeably. The point net 1110 may be trained to recognize the anticipated different roof tops. The point net 1110 may regress or fit a primitive model to a small region or subset of the point cloud 1102, as shown in FIG. 14. The parameters 1402 predicted by the point net 1110 are the normalized shape parameters for a Point Distribution Model 1802 for that primitive. These parameters 1402 may be combined with a mean shape 1404, shape vectors (not shown), and eigenvalues (not shown) for the specific primitive to reconstitute the vertices 1406 and faces 1408 for the primitive, and eventually the reconstructed mesh 1410.

In one or more embodiments, twenty-five (25) primitive types may be used as primitive sets, which may cover the most common roof types. Other suitable numbers may be used. For certain roof types, different directions may be included, e.g., four directions for shed roofs may be included. A fixed number (e.g., 2048, or any other suitable number) of points may be sampled for each primitive. To simulate the digital height model, one or more embodiments may add uniform random noise on rotation angle along the z-axis (from −45 to 45 degree) and height values (+/−0.1 in the range of [0, 1]). In one or more embodiments, 500 point clouds may be randomly sampled for each primitive, where different views may be treated as different classes; and a total 7500 synthetic point clouds may be used for training and validation. Other suitable numbers of point clouds and synthetic point clouds may be used.

Turning back to the Point Net 1110, in one or more embodiments, the Point Net primitive model 1110 may be trained 1111 on a training set 1112 of primitives for common roof shapes. Then the Point Net Primitive model 1110 may be used for primitive classification. The training 1111 may be via simulations to generate points 1109 (via point synthesis 1113) on the primitives that the Point Net primitive model 1110 may use to analyze a given input set of points (point cloud 1102). In one or more embodiments, a feature may be generated for each point in the point cloud. The feature may be various functions of that point's coordinates. Each point may be processed independently before it is reassembled with the other points so that the primitive fitting module 1615 can determine which type of shape it is. The advantages of using primitive classification, as opposed to first using a shape classifier to limit the overhead of fitting, are 1) it is more robust to the input point cloud noises and 2) it runs faster as it avoids fitting each primitive into the point cloud. Otherwise, with first using the shape classifier, it would be attempting to fit each and every shape in the library, which is a fairly expensive operation. The output of the primitive fitting module 1615 is a predicted primitive model 1114 (e.g., the shape is a hangar, dome, flat).

In cases where the predicted primitive model 1114 does not find a good match against the primitive library (e.g., irregular shapes), shape regularization and extrusion may be used to better reconstruct the building model and more concisely represent the input point cloud 1102. In some embodiments, the primitive fitting module 1615 determines that a good match is not found by thresholding the probability output of the shape classifier. In some embodiments, a Douglas-Peucker algorithm may be used for the shape refinement and vertex estimation, which may simplify the contour and generate polygon vertices. Then extrusion may be applied to generate a mesh model. In the event the region passed into the fitting routine does not match one of the primitives in the library (due to perhaps a poor decomposition, or a building construct not yet captured in the primitive library), an extrusion process may be used. The output of the extrusion process is a contour of the shape (that may be simplified using the Douglas Pucker algorithm, while still providing a good approximation of the contour). The contour of the shape may then be used as the shape, by duplicating the contour and placing vertical faces between contour points that represent the heights of the region being modeled in our normalized space.

Next, a registration process 1115 is applied to find the transformation matrix parameters to map the predicted primitive model 1114 to the input shape from the data of the point cloud so that the predicted model 1114 is appropriately represented in the original space. The registration process 1115 computes the transformation matrix that maps the individual points in the predicted primitive model 1114 to the points from the actual data 1102. In one or more embodiments, the registration process 1115 may include a Coherent Point Drift (CPD). CPD is a probabilistic method for determining point set registration that ultimately determines that transformation matrix required to map one point representation to another (e.g., map the primitive point representation to the normalized input point representation). Coherent Point Drift (CPD) registration process 1115 may be applied to align the predicted primitive model 1114 with the actual data (e.g., the target 3D point clouds). It may be assumed that the transform is rigid, thus the parameter space only involves rotation, translation and scale. The results from the primitive fitting may be compared against alternative hypothesis (e.g. the box fitting or extrusion methods mentioned earlier), and the representation that has the best metric may be selected as the final representation for the section (e.g. 3D IoU, which in turn may be weighted by shape complexity). In one or more embodiments the CPD registration process 1115 calculates a 3D rotation, translation, and scale factor to take the identified predicted primitive model 1114 and project that into a feasible answer for the particular domain. For example, a user may not want a 3D rotation, but instead only a rotation about the z-axis. As such, in some embodiments, the registration process 1115 may include a limit (e.g., remove degrees of freedom of rotation, etc.). Only rotating the model about the z-axis may, for example, avoids a roof that's tilted, because ultimately it is desirable to have the roof sit on the building. Without the rotational constraints, the registration process 1115 may tilt the roof to fit the data better, and the model; however, this may not better represent real-world roofs.

Model Selection

In one or more embodiments, each building shape, which may have been identified by Mask R-CNN/segmentation, a box or rectangular prism, may be fit to the ROI. If that fit satisfies the IoU criterion, that fitting process terminates. When the simplest representation satisfies the metric, that representation may be used without searching for alternate representations. Otherwise, part of the process 700 shown in FIG. 7 proceeds with the primitive and roof model fitting, as described above, as well as with an extrusion fitting model. Then, a selection module 1617 evaluates which of the three models to select—the initial box model, the best primitive fitting model, or the extrusion model. To effect this decision, the selection module 1617 includes one or more model selection criterion 1618 which strives to balance an IoU term and a model complexity term. The model selection criterion 1618 is a weighted sum of an IoU and a term that is inversely proportional to the number of vertices in the model, represented as:

$$f_{obj} = \alpha * IOU + (1-\alpha) * \frac{8}{N} \qquad i$$

As a non-exhaustive example, the selection module 1617 may need to choose between an extrusion model with 24 vertices and an IoU of 0.84, a box model with 8 vertices and an IoU of 0.79. The model selection criterion 1618 provides for the balance of accuracy with complexity.

Regarding texturing, the stage may, in one or more embodiments, involve mapping the texture coordinates of the true orthographic color image to the output 3D model, as shown in FIG. 10C. The conventional texturing is limited to the overhead view, and simply wraps the roof texture to the building sides.

Figure 15:
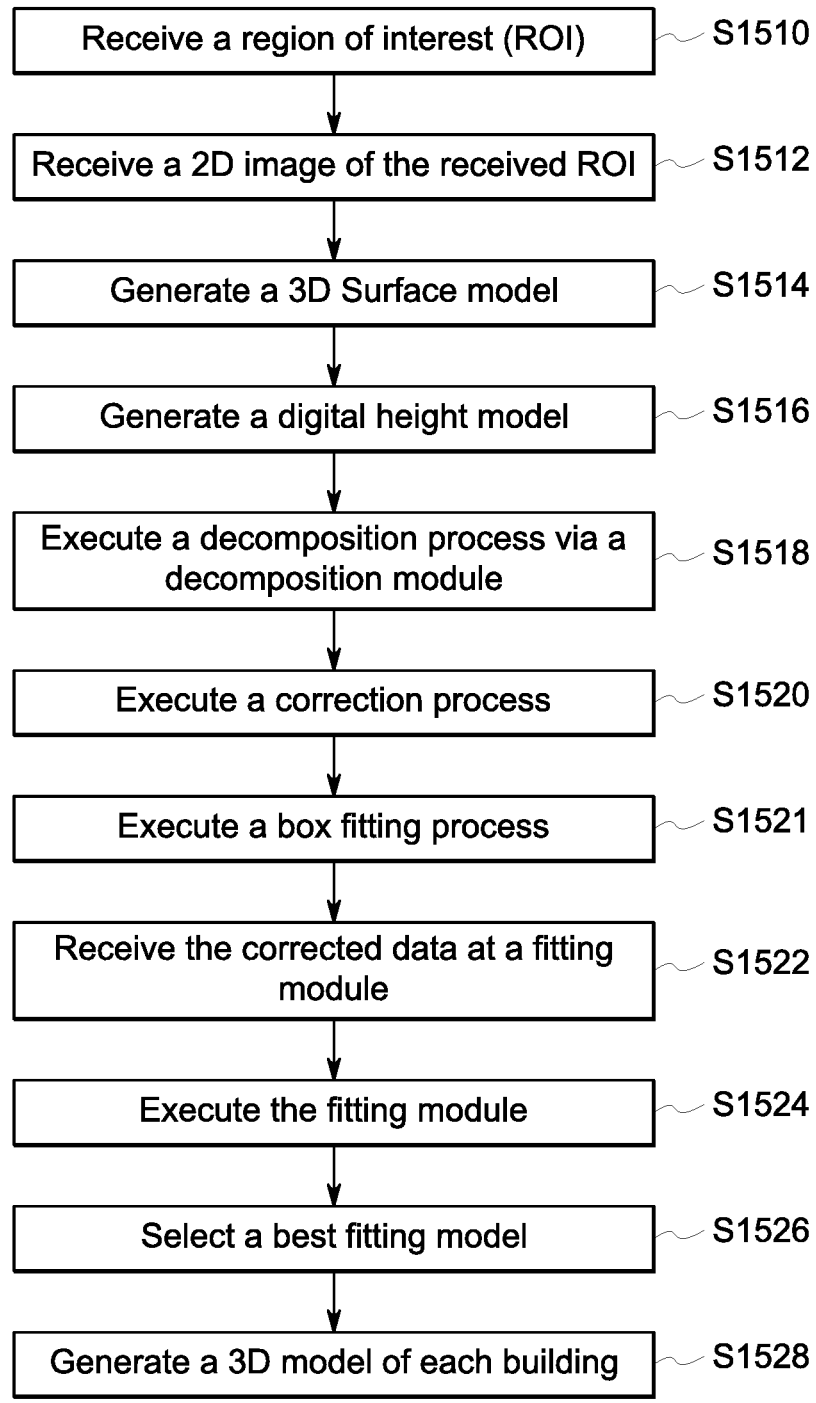
FIG. 15 is a process according to some embodiments.
Figure 16:
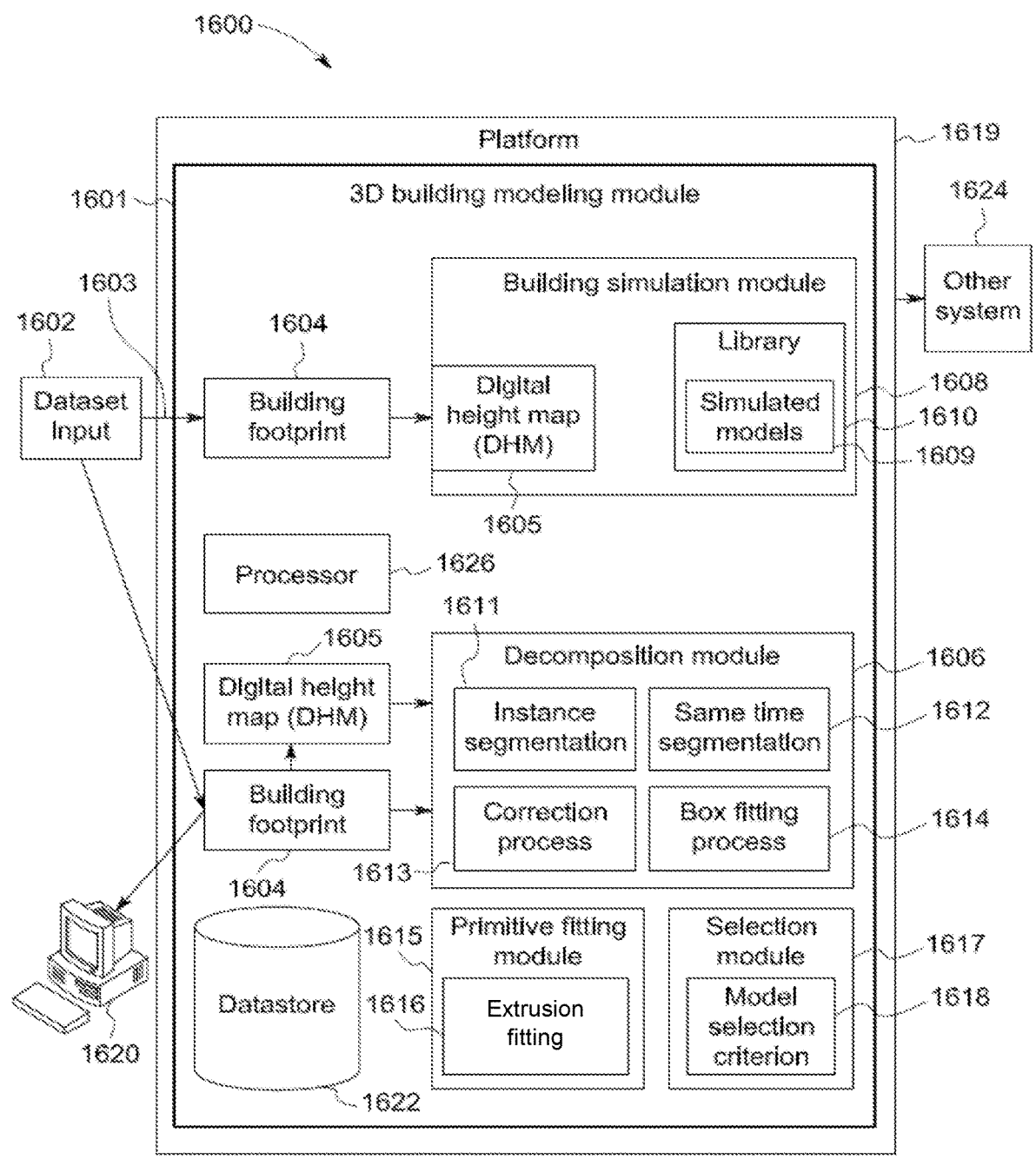
FIG. 16 is a system architecture according to some embodiments.
Figure 17:
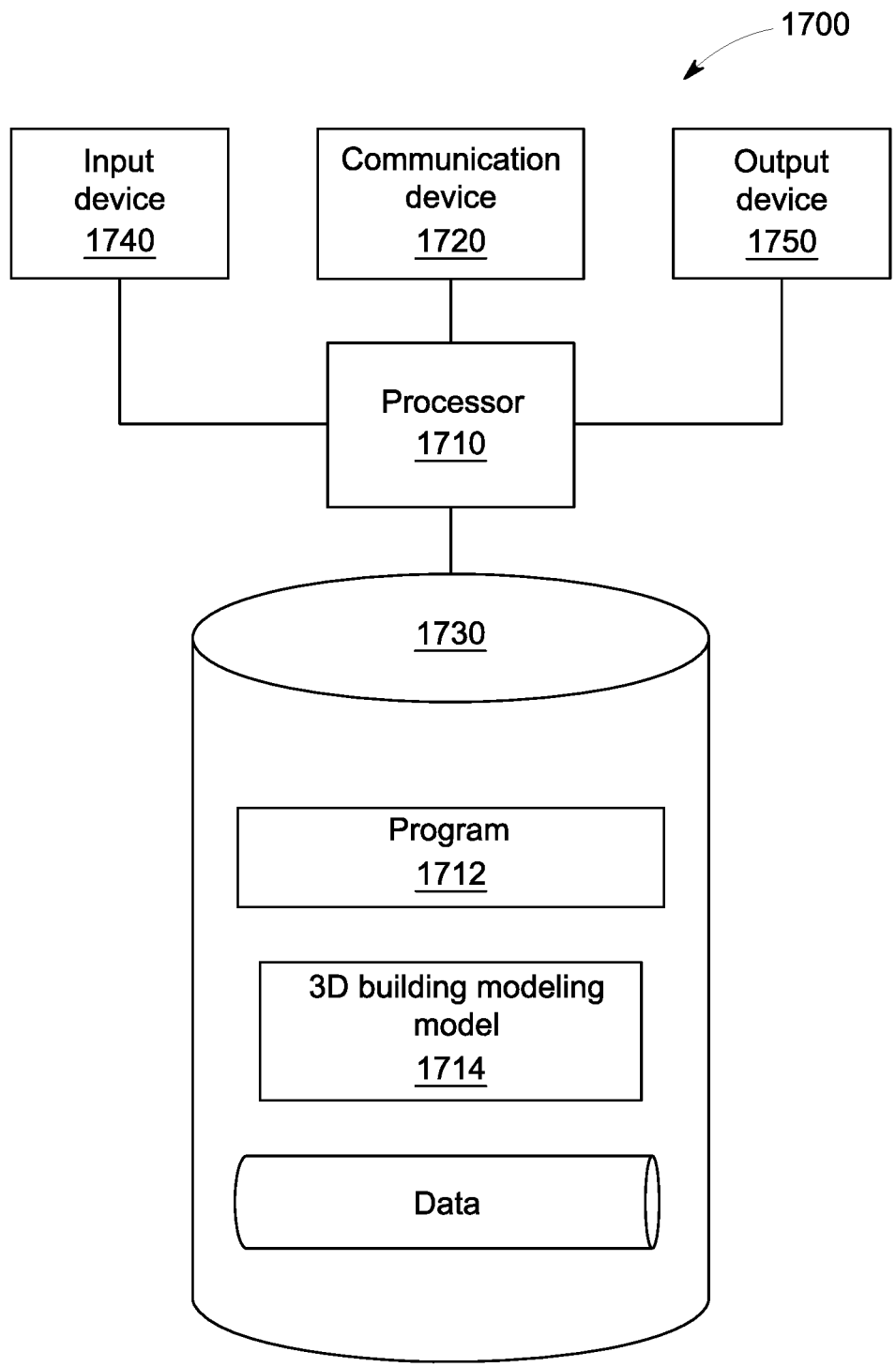
FIG. 17 is a block diagram of an architecture according to some embodiments.

Turning to FIGS. 15-17, a system 1600/1700 and examples of operation according to some embodiments are provided. In particular, FIG. 15 provides a flow diagram of a process 1500, according to some embodiments. Process 1500, and any other process described herein, may be performed using any suitable combination of hardware (e.g., circuit(s)), software or manual means. For example, a computer-readable storage medium may store thereon instructions that when executed by a machine result in performance according to any of the embodiments described herein. In one or more embodiments, the system 1600/1700 is conditioned to perform the process 1500 such that the system is a special-purpose element configured to perform operations not performable by a general-purpose computer or device.

Software embodying these processes may be stored by any non-transitory tangible medium including a fixed disk, a floppy disk, a CD, a DVD, a Flash drive, or a magnetic tape. Examples of these processes will be described below with respect to embodiments of the system, but embodiments are not limited thereto. The flow charts described herein do not imply a fixed order to the steps, and embodiments of the present invention may be practiced in any order that is practicable.

Initially at S1510, a region of interest is received at the system 1600. Then at S1512, a 2D image 1603 of the received ROI is received from a data source 1602. The Digital Surface Model (DSM) is a dense 2.5D representation of heights, where each xy cell contains the z-height above the geoid model (or any height reference). The 3D building modeling module 1601 generates a Digital Terrain Map (DTM), which is a 2.5D representation of terrain based on the received image 1603 in 51514. In embodiments, the surface model (DSM) (which may also be a point-cloud) is received and the terrain is separated from the manmade structures. The DSM or point cloud represents the complete surface. The DTM is a representation of the terrain along with the approximate surface the building sits on at ground level. The Digital Height Model (DHM) is the difference between the DSM and DTM, meaning it is a measure of manmade objects sitting on top of the terrain. The DHM is effectively zero (0) everywhere there is no structure, and the non-zero values represent the height above ground of the manmade structures (this is the starting point for the modeling). A digital height model (DHM) 1605 (height above ground for man-made object) including a baseline building elevation (not shown) is generated in S1516 based on the subtraction of the DSM from the DTM. It is noted that the DHM may be generated with a 3D point cloud instead of a 2.5D representation. The DHM 1605 covers a ROI, including the building footprint 1604 of one of the identified buildings. Next, in S1518, the decomposition module 1606 receives the DHM 1605 including the building footprint 1604, and applies a decomposition process (i.e., instance segmentation 1611 or same time segmentation 1612) to decompose the building into a set of shapes 804. A correction process 1613 may be applied to the output of the decomposition process (set of shapes) in S1520. The decomposition module 1606 may then execute a box fitting process 1614 on the corrected output (e.g., pre-processed ROI image) in S1521. As described above, it is then determined at 702 whether a high enough 3D IoU metric is achieved for the box fitting. When the high enough metric is achieved at 702 (indicated by "yes" to initial model selection), the primitive fitting process may be avoided, and the 3D model may be generated. When the high enough metric is not achieved at 702 (indicated by "no" to initial model selection), the corrected set of shapes is received as a data point cloud 110 at the primitive fitting module 1615 and/or extrusion fitting 1616 (FIG. 7) in S1522 to generate alternative hypotheses via execution of the fitting models (1615, 1616) in S1524 that may be compared in S1526 for the best representation primitive fitting model. The primitive fitting module 1615 applies a primitive and classification process to each section to output a 3D representation of the shape (vertices and faces) that represents each shape of the building in the complete reconstructed mesh (sparse). The extrusion fitting 1616 outputs a mesh model that is a contour of the shape (that may be simplified using the Douglas Pucker algorithm, while still providing a good approximation of the contour.) After the fitting processes (1615 and 1616), a 3D representation of the shape (vertices and faces) that represent each shape of the building in the complete reconstructed mesh (sparse) is available, where each piece may have been from the box, primitive or extruded shape. S1526, the selection module 1617 selects a best fitting model. Based on the selected best fit model, the 3D building modeling module 1601 generates a 3D model 1004 of each building in S1528, which may be output to a user interface 1620 or other suitable system 1624.

FIG. 16 is a block diagram of system architecture 1600 according to some embodiments. Embodiments are not limited to architecture 1600.

Architecture 1600 includes a platform 1619, a building simulation module 1608, a decomposition module 1606, a primitive fitting module 1615, a selection module 1617, a user platform 1620, a data store 1622 (e.g., database). In one or more embodiments, the modules may reside on the platform 1619. Platform 1619 provides any suitable interfaces through which users/other systems 1624 may communicate with the modules.

In one or more embodiments, the output of the 3D building modeling module 1601 may be output to a user platform 1620 (a control system, a desktop computer, a laptop computer, a personal digital assistant, a tablet, a smartphone, etc.) to view information about the buildings in a ROI. In one or more embodiments, the output from the 3D building modeling module 1601 may be transmitted to various user platforms or to other system (1624), as appropriate (e.g., for display to, and manipulation by, a user, further analysis and manipulation).

In one or more embodiments, the system 1600 may include one or more processing elements 1626 and a memory/computer data store 1622. The processor 1626 may, for example, be a microprocessor, and may operate to control the overall functioning of the modules. In one or more embodiments, each module may include a communication controller for allowing the processor 1626, or any respective processor, and hence the module, to engage in communication over data networks with other devices (e.g., user interface 1620 and other system 1624).

In one or more embodiments, the system 1600 may include one or more memory and/or data storage devices 1622 that store data that may be used by the module(s). The data stored in the data store 1622 may be received from disparate hardware and software systems, some of which are not inter-operational with one another. The systems may comprise a back-end data environment employed by a business, industrial or personal context.

In one or more embodiments, the data store 1622 may comprise any combination of one or more of a hard disk drive, RAM (random access memory), ROM (read only memory), flash memory, etc. The memory/data storage devices 1622 may store software that programs the processor 1626 and the modules to perform functionality as described herein.

As used herein, devices, including those associated with the system 1600 and any other devices described herein, may exchange information and transfer input and output ("communication") via any number of different systems. For example, wide area networks (WANs) and/or local area networks (LANs) may enable devices in the system to communicate with each other. In some embodiments, communication may be via the Internet, including a global internetwork formed by logical and physical connections between multiple WANs and/or LANs. Alternately, or additionally, communication may be via one or more telephone networks, cellular networks, a fiber-optic network, a satellite network, an infrared network, a radio frequency network, any other type of network that may be used to transmit information between devices, and/or one or more wired and/or wireless networks such as, but not limited to Bluetooth access points, wireless access points, IP-based networks, or the like. Communication may also be via servers that enable one type of network to interface with another type of network. Moreover, communication between any of the depicted devices may proceed over any one or more currently or hereafter-known transmission protocols, such as Asynchronous Transfer Mode (ATM), Internet Protocol (IP), Hypertext Transfer Protocol (HTTP) and Wireless Application Protocol (WAP).

The embodiments described herein may be implemented using any number of different hardware configurations. For example, FIG. 17 is a block diagram of a 3D building modeling platform 1700 that may be, for example, associated with a system of FIG. 16. The 3D building modeling platform 1700 comprises a processor 1710, such as one or more commercially available Central Processing Units ("CPUs") in the form of one-chip microprocessors, coupled to a communication device 1720 configured to communicate via a communication network (not shown in FIG. 17). The communication device 1720 may be used to communicate, for example, with one or more remote data sources, user platforms, etc. The 3D building modeling platform 1700 further includes an input device 1740 (e.g., a computer mouse and/or keyboard to input building/region of interest information, etc.) and/an output device 1750 (e.g., a computer monitor to render a display, provide alerts, transmit recommendations, and/or create reports). According to some embodiments, a mobile device, monitoring physical system, and/or PC may be used to exchange information with the 3D building modeling platform 1700.

The processor 1710 also communicates with a storage device 1730. The storage device 1730 may comprise any appropriate information storage device, including combinations of magnetic storage devices (e.g., a hard disk drive), optical storage devices, mobile telephones, and/or semiconductor memory devices. The storage device 1730 stores a program 1712 for controlling the processor 1710. The processor 1710 performs instructions of the programs 1712, 1714, and thereby operates in accordance with any of the embodiments described herein. For example, the processor 1710 may receive data. The processor 1710 may then perform a process to generate a 3D building model.

The programs 1712, 1714 may be stored in a compressed, uncompiled and/or encrypted format. The programs 1712, 1714 may furthermore include other program elements, such as an operating system, clipboard application, a database management system, and/or device drivers used by the processor 1710 to interface with peripheral devices.

As used herein, information may be "received" by or "transmitted" to, for example: (i) the 3D building modeling platform 1700 from another device; or (ii) a software application or module within the 3D building modeling platform 1700 from another software application, module, or any other source.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems). For example, although some embodiments are focused on buildings, any of the embodiments described herein could be applied to other types of structures, etc. Moreover, note that some embodiments may be associated with a display of information to an operator.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system comprising:
   a 3D building modeling module;
   a memory for storing program instructions; and
   a 3D building modeling processor, coupled to the memory, and in communication with the 3D building modeling module and operative to execute program instructions to:
   receive a region of interest;
   receive a 2D image of the region of interest from a data source;
   generate a surface model based on the received 2D image including one or more buildings;
   generate a digital height model for the surface model;
   decompose each building in the generated digital height model into a set of shapes, wherein each shape is a 3D geometric object that replaces portions of the digital height model;
   apply a correction process to the set of shapes;
   execute a primitive classification process to each shape, wherein the primitive classification process individually compares points on a set of primitive types in a library to respective points on the shape;
   execute a fitting process to each classified shape;
   select a best fitting model; and
   generate a 3D model of each building.

2. The system of claim 1, wherein the 2D image is a satellite image.

3. The system of claim 1, wherein decomposition of each building further comprises program instructions to:
   execute one of an instance segmentation process and a same time segmentation process.

4. The system of claim 3, wherein execution of one of the instance segmentation process and the same time segmentation process further comprises program instructions to:
   decompose each building into the set of shapes based on training data in the library.

5. The system of claim 1, wherein the fitting process further comprises program instructions to:
   register, via a fitting module, each shape in the set of shapes to a point cloud for the shape, wherein the point cloud is a plurality of points sampled from the generated surface model.

6. The system of claim 1, wherein the classification process further comprises program instructions to:
   complete any missing side of each decomposed shape.

7. The system of claim 1, wherein selection of a best fitting model further comprises program instructions to:
   execute a selection module, operative to select a best fitting model based on one or more model selection criterion.

8. The system of claim 1, further comprising program instructions to, prior to receipt of the region of interest:
   generate a plurality of simulated models, via a building simulation module.

9. A computer-implemented method comprising:
   receiving a region of interest;
   receiving a 2D image of the region of interest from a data source;
   generating a surface model based on the received 2D image including one or more buildings;
   generating a digital height model for the surface model;
   decomposing each building in the generated digital height model into a set of shapes, wherein each shape is a 3D geometric object that replaces portions of the digital height model;
   applying a correction process to the set of shapes;
   executing a primitive classification process for each shape, wherein the primitive classification process individually compares points on a set of primitive types in a library to respective points on the shape;
   executing a fitting process for each classified shape;
   selecting a best fitting model; and
   generating a 3D model of each building.

10. The method of claim 9, wherein decomposing each building further comprises:
    executing one of an instance segmentation process and a same time segmentation process.

11. The method of claim 10, wherein executing one of the instance segmentation process and the same time segmentation process further comprises:
    decomposing each building into the set of shapes based on training data in the library.

12. The method of claim 9, wherein the fitting process further comprises:
    registering, via a fitting module, each shape in the set of shapes to a point cloud for the shape, wherein the point cloud is a plurality of points sampled from the generated surface model.

13. The method of claim 9, wherein the classification process further comprises:
    completing any missing side of each decomposed shape.

14. The method of claim 9, wherein selecting the best fitting model further comprises:
    selecting, via execution of a selection module, a best fitting model based on one or more model selection criterion.

15. The method of claim 9, further comprising, prior to receipt of the region of interest:
    generating a plurality of simulated models, via a building simulation module.

16. A non-transitory, computer-readable medium storing instructions to be executed by a processor to perform a method comprising:
    receiving a region of interest;
    receiving a 2D image of the region of interest from a data source;
    generating a surface model based on the received 2D image including one or more buildings;
    generating a digital height model for the surface model;
    decomposing each building in the generated digital height model into a set of shapes, wherein each shape is a 3D geometric object that replaces portions of the digital height model;
    applying a correction process to the set of shapes;

executing a primitive classification process for each shape, wherein the primitive classification process individually compares points on a set of primitive types in a library to respective points on the shape;

executing a fitting process for each classified shape;

selecting a best fitting model; and generating a 3D model of each building.

17. The medium of claim 16, wherein decomposing each building further comprises:

executing one of an instance segmentation process and a same time segmentation process.

18. The medium of claim 17, wherein executing one of the instance segmentation process and the same time segmentation process further comprises:

decomposing each building into the set of shapes based on training data in the library.

19. The medium of claim 16, wherein the fitting process further comprises:

registering, via a fitting module, each shape in the set of shapes to a point cloud for the shape, wherein the point cloud is a plurality of points sampled from the generated surface model.

20. The medium of claim 16, further comprising:

selecting, via execution of a selection module, a best fitting model based on one or more model selection criterion.

* * * * *